US009509823B2

(12) United States Patent
Ashizuka et al.

(10) Patent No.: US 9,509,823 B2
(45) Date of Patent: Nov. 29, 2016

(54) CORDLESS TELEPHONE SYSTEM AND HANDSET THEREOF

(71) Applicant: Panasonic Corporation, Osaka (JP)

(72) Inventors: Tetsuya Ashizuka, Fukuoka (JP); Junpei Tsukamoto, Fukuoka (JP); Hiroshi Harada, Fukuoka (JP)

(73) Assignee: Panasonic Intellectual Property Management Co., LTD., Osaka (JP)

( * ) Notice: Subject to any disclaimer, the term of this patent is extended or adjusted under 35 U.S.C. 154(b) by 0 days.

(21) Appl. No.: 14/221,737

(22) Filed: Mar. 21, 2014

(65) Prior Publication Data

US 2014/0287785 A1    Sep. 25, 2014

(30) Foreign Application Priority Data

| Mar. 25, 2013 | (JP) | 2013-062235 |
| Mar. 25, 2013 | (JP) | 2013-159635 |
| Mar. 25, 2013 | (JP) | 2013-159636 |
| Mar. 25, 2013 | (JP) | 2013-159638 |

(51) Int. Cl.
*H04W 72/00* (2009.01)
*H04M 1/725* (2006.01)

(52) U.S. Cl.
CPC ..... *H04M 1/72505* (2013.01); *H04M 1/72502* (2013.01)

(58) Field of Classification Search
CPC ........... H04M 1/72511; H04M 1/725; H04M 1/72505; H04W 84/18; H04W 84/16; H04W 88/06; H04W 4/16; H04W 48/16; H04W 72/04; H04W 24/00; H04W 52/02; H04W 56/00; H04W 72/0446; H04W 80/04; H04W 36/04; H04W 4/12; G06K 19/0723; H04B 1/28; H04B 1/1607; H04B 1/40; G01L 15/063; G01L 15/265

USPC ......... 455/464, 41.2, 74.1, 465, 426.1, 445, 455/462, 434, 41.1, 450, 452.2, 334, 345, 455/132, 343.1, 343.2, 574, 73; 370/350, 370/336, 331; 704/245, 275

See application file for complete search history.

(56) References Cited

U.S. PATENT DOCUMENTS

| 6,470,187 | B1 * | 10/2002 | Rosen | H04M 1/733 |
| | | | | 455/426.1 |
| 6,553,424 | B1 * | 4/2003 | Kranz et al. | 709/234 |
| 2001/0025244 | A1 * | 9/2001 | Kopp | 704/275 |
| 2004/0058686 | A1 * | 3/2004 | Odman | 455/450 |
| 2005/0197061 | A1 * | 9/2005 | Hundal | H04M 1/6033 |
| | | | | 455/41.2 |
| 2008/0090544 | A1 * | 4/2008 | Hubert | H04B 3/548 |
| | | | | 455/334 |
| 2010/0173627 | A1 | 7/2010 | Gustafson et al. | |
| 2013/0336307 | A1 * | 12/2013 | Park et al. | 370/350 |

FOREIGN PATENT DOCUMENTS

| EP | 2 018 029 A1 | 1/2009 |
| JP | H04334133 A | 11/1992 |
| JP | H05244088 A | 9/1993 |
| JP | H09219678 A | 8/1997 |
| JP | H11308666 A | 11/1999 |

OTHER PUBLICATIONS

Office Action mailed Oct. 29, 2013, for JP2013-159638, 3 pages.
Extended European Search Report dated Sep. 23, 2016, for corresponding EP Application No. 14161356.2-1959/2785027, 8 pages.

* cited by examiner

*Primary Examiner* — Charles Appiah
*Assistant Examiner* — Alexander Yi
(74) *Attorney, Agent, or Firm* — Seed IP Law Group LLP

(57) ABSTRACT

A cordless telephone system includes a base unit (100) configured to be connected to a telephone line, and a handset (202) configured to transmit and receipt radio waves to and from the base unit 100 via wireless channel, wherein the handset (202) includes an interface (57; 56, 95) for connection with an information terminal (300), and the handset is configured to set, in a standby state, a reception timing asynchronously with a transmission timing of the base unit, and to establish synchronization with the base unit when the information terminal is to be connected to the telephone line via the handset and the base unit.

15 Claims, 12 Drawing Sheets

CORDLESS TELEPHONE SYSTEM AND HANDSET THEREOF

TECHNICAL FIELD

The present invention relates to a cordless telephone system capable of connecting an information terminal, such as a smartphone, to a telephone line. The present invention also relates to a handset of such a cordless telephone system.

BACKGROUND OF THE INVENTION

In recent years, information terminals such as smartphones are being used by a growing number of users. These information terminals are configured to be capable of making phone calls or connecting to the Internet via wireless channels provided by 3G (3rd Generation), Wi-Fi (Wireless Fidelity) or other wireless communication technologies. On the other hand, buildings such as houses are usually equipped with wired telephone lines. However, users of the information terminals tend to make calls over 3G wireless channels or the like even in buildings equipped with telephone lines, and thus, the communication/call costs tend to be high.

To address such a problem, it is proposed to provide a mobile phone having a battery box mount provided with an external interface for connection with a control unit, such that an adapter to a cordless telephone system can be detachably attached to the battery box mount, where the adapter includes a wireless unit, an antenna, a battery unit and an adapter-side interface for connection with the external interface and performs transmission and reception to and from the base unit of the cordless telephone system by use of radio waves (JPH04-334133A).

Further, there is disclosed a mobile phone including a first transmitting and receiving unit that uses a first frequency used by a cordless telephone system, a second transmitting and receiving unit that uses a second frequency allocated to general cellular phones, a switching means for switching the first and second frequencies when placing a call, and a monitoring means that simultaneously monitors the first and second frequencies of the radio waves received by the first and second transmitting and receiving units (JPH05-244088A).

To achieve a smartphone having a function of connecting to the telephone line by use of a cordless telephone system, it may be conceived to provide a battery-operated handset relaying communication between the smartphone and the base unit of the cordless telephone system, where the user of the smartphone carries the handset together with the smartphone. In such a case, it is preferred to make the handset as small in size as possible in view of portability. However, reduction in size of the handset tends to limit the battery capacity of the handset, and therefore, it is required to reduce the power consumption of the handset.

It may be also conceived to adapt the handset to receive electric power from the handset from the battery of the smartphone. However, it is already an important issue that smartphones tend to consume battery power quickly. Namely, smartphones have a computation power comparable to that of PCs (personal computers) and a relatively large screen size, and these result in a large power consumption. Thus, if the handset is configured to receive electric power from the battery of the smartphone, the power of the battery of the smartphone will be consumed even more quickly. Therefore, in such a case also, it is required to reduce the power consumption of the handset.

JPH04-334133A discloses an adapter to a cordless telephone system detachably mounted to a mobile phone and relaying communication between the mobile phone and the base unit of the cordless telephone system. However, there is no disclosure in this document of a detailed mode of operation of the adapter, which is a handset of the cordless telephone system, and it is difficult to achieve reduction in the power consumption with the structure disclosed in this document.

The technology disclosed in JPH05-244088A relates to "simultaneously monitoring the first and second frequencies of the radio waves received by the first and second transmitting and receiving units," and thus, in the mobile phone based on this technology, multiple transmitting and receiving units operate simultaneously, and this may rather increase the power consumption.

SUMMARY OF THE INVENTION

The present invention is made to solve the foregoing problems in the prior art, and a primary object of the present invention is to provide a cordless telephone system which can connect an information terminal and a handset with each other via a prescribed interface such that the information terminal can be connected to the telephone line via the handset and the base unit and which can considerably reduce the power consumption of the handset in a standby state so that transmission and reception of audio data using the information terminal can be performed for an extended period of time.

To achieve the foregoing object, in one aspect of the present invention, there is provided a cordless telephone system, including: a base unit configured to be connected to a telephone line; and a handset configured to transmit and receive radio waves to and from the base unit via wireless channel, wherein: the handset includes an interface for connection with an information terminal; and the handset is configured to set, in a standby state, a reception timing asynchronously with a transmission timing of the base unit, and to establish transmission and reception synchronization with the base unit when the information terminal is to be connected to the telephone line via the handset and the base unit.

According to this structure, in the standby state the reception timing of the handset is asynchronous with the transmission timing of the base unit, and therefore, during this asynchronous period (standby period), the handset does not receive control data from the base unit and thus does not need to interpret or analyze the control data. This can considerably reduce the power consumption of the handset connected with the information terminal during the standby period.

Preferably, in the standby state, the base unit sets the transmission timing at a first periodic interval and the handset sets the reception timing at a second periodic interval longer than the first periodic interval, and when the information terminal is to make an outgoing call via the handset and the base unit, the handset sets a reception period having a duration longer than the first periodic interval and the handset establishes transmission and reception synchronization with the base unit based on control data transmitted by the base unit during the reception period. Further, since the periodic interval (second periodic interval) of the reception timing of the handset in the standby state is longer than the periodic interval (first periodic interval) of the transmission timing of the base unit, the power consumption of the handset can be reduced compared with a case where the second periodic interval is set to be equal to the first periodic interval.

According to this structure, by setting a reception period having a duration longer than the periodic interval of the transmission timing of the base unit, the handset can reliably receive control data transmitted by the base unit and establish synchronization with the base unit.

Also preferably, in the standby state, the base unit sets the transmission timing at a first periodic interval and the handset sets the reception timing at a second periodic interval longer than the first periodic interval, and, when the information terminal is to receive an incoming call via the base unit and the handset, the base unit sets a transmission period having a duration longer than the second periodic interval and the handset establishes transmission and reception synchronization with the base unit based on control data transmitted by the base unit during the transmission period.

According to this structure, since the base unit transmits the control data (activation signal) continuously over during the transmission period, the handset can reliably receive the activation signal transmitted by the base unit and establish synchronization with the base unit.

Also preferably, when the information terminal performs transmission and reception of audio data via the handset and the base unit after the establishment of synchronization between the handset and the base unit, the handset sets the reception timing at the first periodic interval.

This structure allows audio data to be transmitted and received between the base unit and the handset, such that calls can be made with clear voice without interruption.

Also preferably, after the establishment of synchronization between the handset and the base unit and before the information terminal performs transmission and reception of audio data via the handset and the base unit, the handset sets the reception timing at a third periodic interval that is longer than the first periodic interval and shorter than the second periodic interval, the third periodic interval being n times the first periodic interval, where n is an integer greater than or equal to 2.

According to this structure, during a period between the standby period and the call period, i.e., during an incoming call notification period, the handset performs reception operation at such a periodic interval that can maintain the synchronization between the base unit and the handset, while reducing the power consumption of the handset.

Also preferably, the base unit and the handset are configured to perform transmission and reception based on time division multiple access.

According to this structure, it is possible to set multiple slots for transmission and reception of audio data or the like, and thus, the cordless telephone system can include multiple handsets, each of which can be connected with an information terminal.

Also preferably, the base unit and the handset are configured as separate members, and the interface is configured to connect the handset and the information terminal via a wireless channel.

According to this structure, it is possible to attach the handset to the information terminal by means of a strap, for example, so that the handset can be carried easily with the information terminal.

Also preferably, the base unit and the handset are configured as separate members, and the interface is configured to connect the handset and the information terminal via a wired channel.

According to this structure, it is possible to supply electric power from the information terminal to the handset, and thus, the handset does not need to have its own battery and can be designed to be small in size.

According to another aspect of the present invention, there is provided a handset of a cordless telephone system, the handset being configured to transmit and receive radio waves via wireless channel to and from a base unit of the cordless telephone system configured to be connected to a telephone line, wherein: the handset includes an interface for connection with an information terminal; and the handset is configured to set, in a standby state, a reception timing asynchronously with a transmission timing of the base unit, and to establish transmission and reception synchronization with the base unit when the information terminal is to be connected to the telephone line via the handset and the base unit.

According to yet another aspect of the present invention, there is provided a cordless telephone system, including: a base unit configured to be connected to a telephone line; a handset configured to transmit and receive radio waves to and from the base unit via wireless channel; and an information terminal configured to be physically connected with the handset, wherein, based on an operation performed by a user on the information terminal, the handset sets, in a standby state, a reception timing asynchronously with a transmission timing of the base unit, and, when the information terminal is to make an outgoing call or receive an incoming call via the telephone line, establishes transmission and reception synchronization with the base unit.

According to yet another aspect of the present invention, there is provided a cordless telephone system, including: a base unit configured to be connected to a telephone line; an information terminal configured to be connected with a mobile wireless channel; and a handset configured to perform wireless communication with the base unit based on DECT standard and to be connected with the information terminal, wherein, when the base unit receives an incoming call via the telephone line while the information terminal is in a standby state, the handset notifies the information terminal of the reception of the incoming call.

According to yet another aspect of the present invention, there is provided a cordless telephone system, including: a base unit configured to be connected to a telephone line; an information terminal configured to be connected with a mobile wireless channel; and a handset configured to perform wireless communication with the base unit based on DECT standard and to be connected with the information terminal, wherein, the information terminal is configured to receive a notification via the handset when the base unit receives an incoming call while the information terminal is in a standby state According to yet another aspect of the present invention, there is provided a cordless telephone system, including: a base unit configured to be connected to a telephone line; an information terminal configured to be connected with a mobile wireless channel; and a handset configured to perform wireless communication with the base unit based on DECT standard and to be connected with the information terminal, wherein the information terminal is configured to be capable of executing a prescribed connection application for communication with the handset, such that in a state where the connection application is being executed, the information terminal can receive a notification from the handset indicating that there is an incoming call at the base unit According to yet another aspect of the present invention, there is provided a cordless telephone system, including: a base unit configured to be connected to a telephone line; an information terminal configured to be connected with a mobile wireless channel; and a handset configured to perform wireless communication with the base unit based on DECT standard and to be connected with the information terminal, wherein the information terminal is configured to be capable of executing a prescribed connection application for communication with the handset, and to notify the handset of a call initiation instruction provided from the prescribed connection application executed by the information terminal.

According to yet another aspect of the present invention, there is provided a cordless telephone system, including: a base unit configured to be connected to a telephone line; a handset configured to transmit and receive radio waves to and from the base unit via wireless channel, and an information terminal configured to be connected with the handset wirelessly, wherein: the handset is configured to be carried together with the information terminal, and, when the information terminal initiates call via the telephone line, to perform transmission and reception of audio data to and from the information terminal.

BRIEF DESCRIPTION OF THE DRAWINGS

Now the present invention is described in the following in terms of preferred embodiments thereof with reference to the appended drawings, in which.

DETAILED DESCRIPTION OF THE PREFERRED EMBODIMENTS (First Embodiment)

In the following, a first embodiment of the present invention will be described with reference to the appended drawings.

Figure 1:
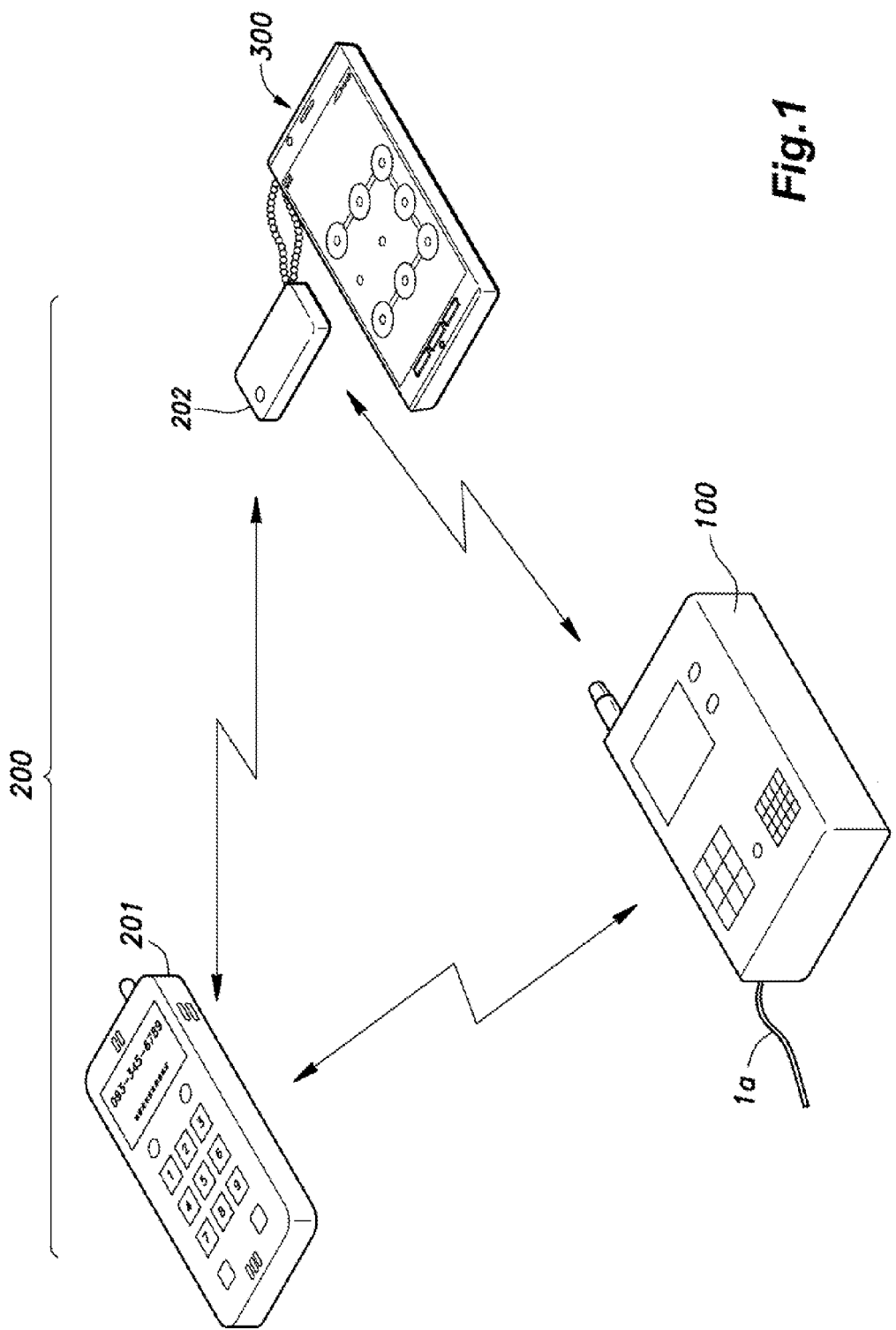
FIG. 1 is an explanatory diagram for showing a relationship between a base unit, a first handset, a second handset and an information terminal relating to a cordless telephone system according to the first embodiment of the present invention.

FIG. 1 is an explanatory diagram for showing a relationship between a base unit 100, a first handset 201, a second handset 202 and an information terminal 300 relating to a cordless telephone system according to the first embodiment of the present invention. As shown in FIG. 1, the cordless telephone system is constituted of a base unit 100 and two handsets 200 (first handset 201 and the second handset 202). In the following description, when it is not necessary to distinguish between the first handset 201 and the second handset 202, they may be referred to as the handset(s) 200. It is to be noted that the number of the handsets 200 that can be included in the system is not limited to two, and the cordless telephone system may include three or more handsets 200, for example. It is also to be noted that in this description, a handset refers to a communication device in the cordless telephone system capable of wirelessly communicating with the base unit directly, and does not necessarily include a microphone and receiver as an ordinary handset of a cordless telephone system. Specifically, in this embodiment, the second handset 202 is not equipped with a microphone and a speaker, as will be described in detail later.

The base unit 100 is connected to a telephone line (wired public telephone line) not shown in the drawings via a cable 1a, and communicates audio data with another telephone via the public telephone line.

The base unit 100 communicates with the first handset 201 via wireless channel, and audio data or the like is transmitted and received between the base unit 100 and the first handset 201. Thereby, the first handset 201 can access the telephone line via the base unit 100. Similarly to the first handset 201, the second handset 202 (corresponds to the "handset" in the claims) also transmits and receives audio data or the like to and from the base unit 100. The second handset 202 additionally includes a Bluetooth (registered trademark) interface, whereby the second handset 202 is connected with the information terminal 300. Bluetooth (registered trademark) is one of the technologies for enabling wireless communication between multiple terminals and provides a communication system or a communication model for linking peers together (peer-to-peer), which model is said to be somewhat similar to that of USB (Universal Serial Bus). Bluetooth (registered trademark) uses radio waves of 2.4 GHz band and allows devices to communicate with each other using time division multiplexing.

In the following description, it is supposed that Bluetooth (registered trademark) technology is used for "near field communication" or "short-range wireless communication." Further, "serial bus" may be USB, and the structural elements (such as a communication unit) related to serial bus may be referred to with terms including "serial bus" at the beginning such as "serial bus communication unit," for example.

The information terminal 300 transmits and receives audio data or the like to and from the second handset 202 via a near field communication interface. The audio data or the like is also communicated between the second handset 202 and the base unit 100, and as a result, the information terminal 300 is connected to the telephone line via the second handset 202 and the base unit 100. Namely, the information terminal 300 can place outgoing calls to the telephone line and receive incoming calls from the telephone line.

FIGS. 2A, 2B, 2C and 2D are overall perspective views of the base unit 100, first handset 201, the second handset 202 and information terminal 300, respectively, relating to the cordless telephone system according to the first embodiment. In the following, with reference to FIGS. 2A, 2B, 2C and 2D, explanation will be given of a general structure of the base unit 100, first handset 201, the second handset 202 and information terminal 300 relating to the cordless telephone system according to the first embodiment.

In the first embodiment, explanation will be made taking as an example a digital cordless telephone system basically conforming to DECT (Digital Enhanced Cordless Telecommunications). DECT is a standard of digital cordless telephone systems established in 2011, and uses a frequency range of 1.9 GHz band (1,895,616 KHz to 1,902,528 KHz) and TDMA (Time Division Multiple Access)-WB as a communication method. It is said that DECT can reduce communication failure caused by radio wave interference with other devices and the 1.9 GHz frequency used in DECT does not interfere with a wireless LAN or a microwave oven, and therefore, DECT can maintain the quality of communication of a facsimile, telephone or the like. Further, DECT is known as a communication method that enables a wideband communication of audio data or the like, in which the state of use of frequency channels is monitored at all times, so that the device itself can select an optimum channel, whereby frequencies can be used efficiently.

Figure 2:
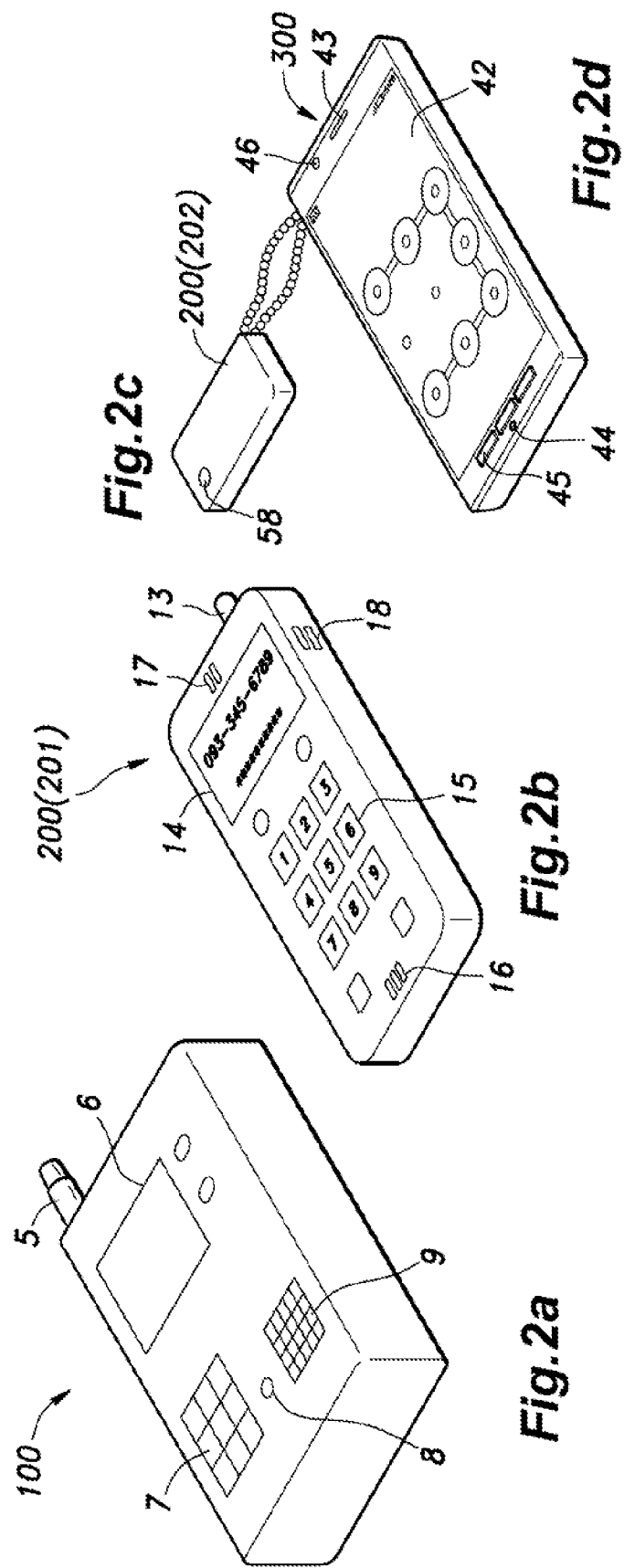
FIGS. 2A, 2B, 2C and 2D are overall perspective views of the base unit, first handset, second handset and information terminal, respectively, relating to the cordless telephone system.

With reference to FIG. 2A, when a user places a phone call using the base unit 100, the user searches for or input the telephone number of a party to be called by use of a display unit 6 and/or an operation unit 7 of the base unit 100 in a manner similar to when using an ordinary fixed-line phone. Once the connection is established, audio data can be communicated between the base unit 100 and another telephone connected thereto via a telephone line. The base unit 100 is equipped with a microphone 8 through which the user's voice is input and a speaker 9 for outputting the voice of the person on the other end of the line, so that the user can talk with the person on the other end of the line in the so-called hands-free condition. It is to be noted that the illustrated base unit 100 is not equipped with a dedicated handset for use in the vicinity thereof, but the base unit 100 may have a dedicated handset which may be wired or wireless.

With reference to FIG. 2B, when using the first handset 201 also, the user inputs or otherwise specifies the telephone number of the party to be called by use of a display unit 14 and/or an operation unit 15 of the first handset 201. The first handset 201 is equipped with a microphone 16 for capturing the voice to be transmitted, an audio-output speaker 17 for outputting the voice based on the received signal, and a ringer speaker 18. The first handset 201 transmits and receives audio data to and from another telephone via the base unit 100.

As shown in FIG. 2C, the second handset 202 is not provided with a user interface such as a display unit or an operation unit, except for a switch 58, and is specifically designed to implement a function of relaying audio data input from the later-described information terminal 300 to the base unit 100. As will be described later, the power consumption of the second handset 202 in a standby state is very small, and thus, the second handset 202 can be operated continuously for an extended period of time with an ordinary battery, and thus, the switch 58 may be omitted. It is to be noted that, an antenna (second handset antenna) 53 of the second handset 202 and an antenna (near field communication antenna) 57 of the information terminal 300 are built-in antennas disposed inside respective casings.

The second handset 202 is designed to be particularly compact in size so as to be easily carried by the user (an exemplary size is about 50×25×7 mm). As shown in the drawings, the second handset 202 may be attached to the information terminal 300 by means of a strap or the like. This makes it easy to carry the second handset 202 together with the information terminal 300. It is also possible to place the second handset 202 in a bag or the like separately from the information terminal 300.

With reference to FIG. 2D, the information terminal 300 includes a touch panel 42, an audio-output speaker 43, a microphone 44, an operation unit 45, a camera 46, an antenna 47 and a ringer speaker 48. It is to be noted that the antenna 47 is disposed inside the information terminal 300 and the ringer speaker 48 is mounted on a rear face of the information terminal 300, and therefore, they are not shown in FIG. 2D.

In the first embodiment, the information terminal 300 is embodied as a so-called smartphone, for example. The aforementioned structural elements constitute a user interface of the information terminal 300, and the user of the information terminal 300 can talk with another person via a 3 G mobile wireless channel by use of the audio-output speaker 43 and the microphone 44. Further, the user can take still pictures or moving pictures by use of the camera 46. In these ordinary operations, the user mainly uses the touch panel 42, but in some operations, the user may use the operation unit 45 including physical switches or the like.

The base unit 100 has an antenna (base unit antenna) 5, and transmits and receives digital audio data superimposed on a carrier wave having a predetermined frequency to and from an antenna (first handset antenna) 13 provided to the first handset 201 or an antenna (second handset antenna) 53 provided to the second handset 202. In this way, audio data and/or other data can be communicated wirelessly between the base unit 100 and the first handset 201 or the second handset 202.

On the other hand, when the user activates a predetermined application software by operating the touch panel 42 of the information terminal 300, the information terminal 300 is connected to the telephone line via the second handset 202 and the base unit 100 described above. When an incoming call is received by the base unit 100, this is notified to the information terminal 300, and the information terminal 300 causes the ringer speaker 48 to emit a predetermined sound to notify the user of the presence of the incoming call. It is to be noted that audio data can be communicated between the first handset 201 and the second handset 202 also, and therefore, a call can be made between the first handset 201 and the information terminal 300 via the second handset 202 so that users using the first handset and the information terminal 300 can talk with each other.

Figure 3:
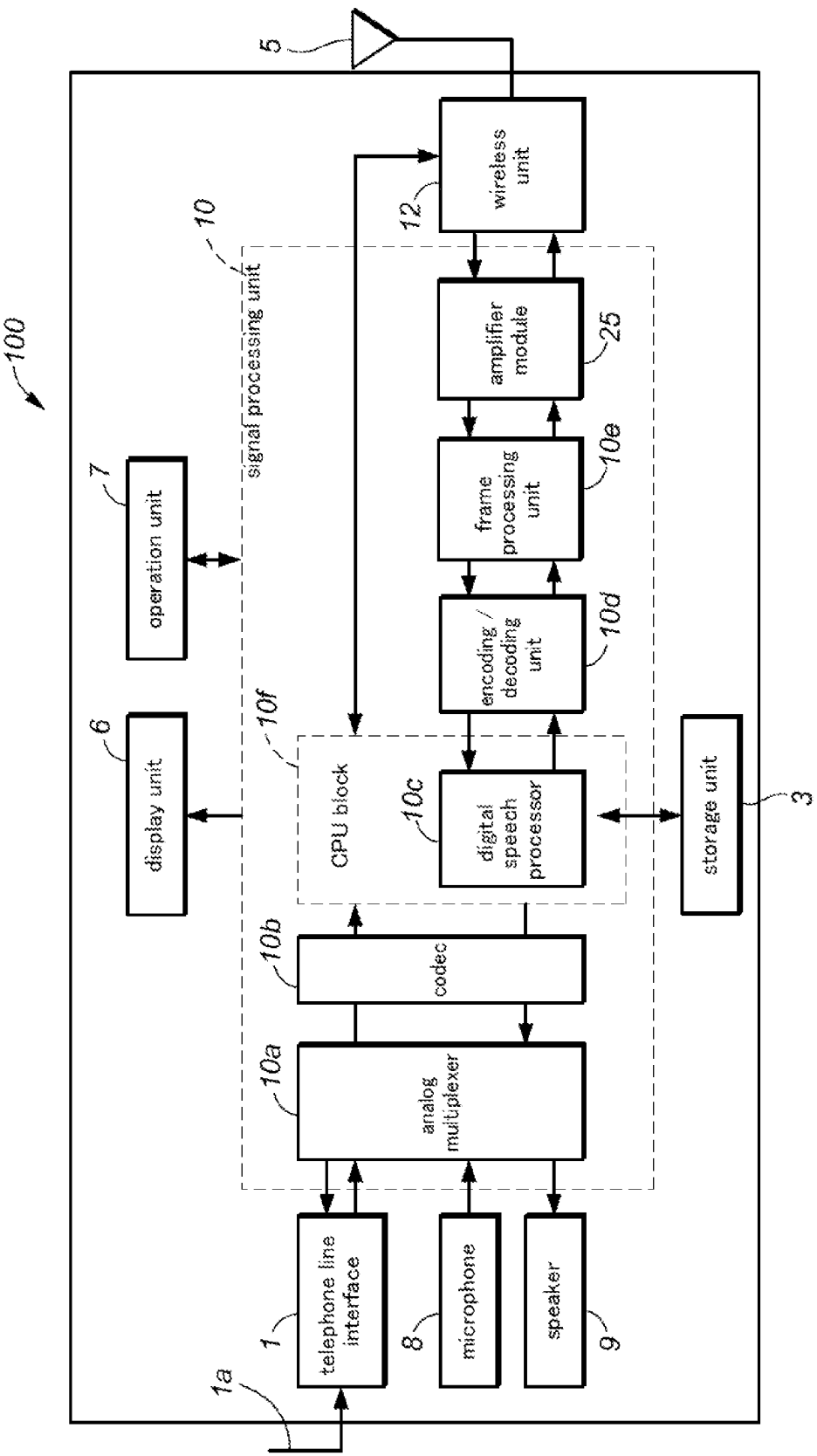
FIG. 3 is a block diagram showing a general structure of the base unit of the cordless telephone system.

FIG. 3 is a block diagram showing a general structure of the base unit 100 of the cordless telephone system. In addition to the above-described display unit 6, operation unit 7, microphone 8 and speaker 9, which serve as a user interface, and the antenna 5, the base unit 100 includes a telephone line interface 1 serving as an external interface such that the base unit 100 connects to the telephone line via the telephone line interface 1 and the cable 1a. Further, the base unit 100 is provided with a storage unit 3, which may be embodied as a flash memory or the like, to store frequently accessed telephone numbers, for example. When the base unit 100 is used as an answering machine, the storage unit 3 may store the transmitted audio signal after the signal is converted into digital form.

The base unit 100 further includes a signal processing unit (control unit) 10, and the signal processing unit 10 includes an analog multiplexer 10a, a codec 10b, a CPU block 10f, an encoding/decoding unit 10d, a frame processing unit 10e, a digital speech processor (speech processing unit) 10c mounted on the CPU block 10f, and an amplifier module 25. In the following, description will be given of the structural elements of the signal processing unit 10. The signal processing unit 10 serves as a control unit to control the entirety of the base unit 100. In the following, description will be made of the structural elements of the signal processing unit 10.

The analog multiplexer 10a selects one of the input/output channels used for the audio signal input via the telephone line interface 1, the audio signal received by the microphone 8, and the audio signal output to the speaker 9, where each of the audio signals is an analog signal.

The codec 10b is a so-called audio codec, and specifically is formed of a DA converter and an AD converter performing conversion between digital and analog signals. An analog audio signal input to the base unit 100 by the codec 10b via the telephone line interface 1 and an analog audio signal acquired by the microphone 8 are converted into digital audio data by the AD converter. On the other hand, digital audio data processed digitally by the digital speech processor 10c, which will be described later, is converted by the DA converter of the codec 10b into an analog audio signal, which is output from the speaker 9.

Though not shown in the drawings, the CPU block 10f includes a CPU (Central Processing Unit), an EEPROM (Electrically Erasable Programmable Read Only Memory) storing a control program, a RAM (random access memory) serving as a work memory, and a bass connecting these component elements, and controls the overall operation of the base unit 100. Further, the CPU block 10f includes the digital speech processor 10c which processes audio data. The digital speech processor 10c performs noise/echo cancellation, enhancement of specific audio frequencies, encryption/description, etc. on the digital audio data obtained through AD conversion performed by the codec 10b and/or the digital audio data decoded by the later-described encoding/decoding unit 10d.

It is to be noted that these audio data processings are often performed as filtering processes including convolution, and a DSP (Digital Signal Processor) or the like specifically designed to perform these signal processings may be used. Of course, the CPU not shown in the drawing and the digital speech processor 10c may be embodied in a single processor. Further, the entirety of the signal processing unit 10 may be embodied as a single DSP.

The encoding/decoding unit 10d encodes a digital signal included in an output from the digital speech processor 10c to be communicated (transmitted) wirelessly via the antenna 5, and decodes a signal (which is already digitized in this embodiment) received via the antenna 5. The encoding/decoding unit 10d adopts ADPCM (Adaptive Differential Pulse Code Modulation) techniques, for example.

The frame processing unit 10e includes a TDD/TDMA (Time Division Duplex/Time Division Multiple Access) processor not shown in the drawings. The TDD/TDMA processor divides each of the periodically occurring frames into units known as slots (channels), so that multiple communications can be performed on the same frequency (time division multiple access). Thus, transmission and reception can be performed in a very short time period by sharing the same frequency, and therefore, transmission and reception may appear to be performed substantially simultaneously. Further, TDMA may be used along with FDMA (Frequency Division Multiple Access) for allocating frequency bands (or channels), thereby to provide a large number of channels while avoiding interferences between frequencies. The frame processing unit 10e switches between transmission (Tx) and reception (Rx) periodically in a short period of time. The structure of the frames used in DECT will be described later.

Further, the frame processing unit 10e includes therein a DA converter and an AD converter not shown in the drawings. The frame processing unit 10e converts with the DA converter a digital signal (transmission signal) input from the digital speech processor 10c via the coding/decoding unit 10d into an analog signal and outputs the analog signal to the amplifier module 25, and converts with the AD converter an analog signal (received signal) input from the wireless unit 12 via the amplifier module 25 into a digital signal and outputs the digital signal to the coding/decoding unit 10d. Thus, an analog signal interface including the amplifier module 25 is provided between the frame processing unit 10e and the wireless unit 12.

The wireless unit 12 includes a transmission circuit (not shown in the drawings) through which the transmission signal (analog signal) output from the amplifier module 25 is passed to the antenna 5 for emission. Further, the wireless unit 12 includes a reception circuit (not shown in the drawings) through which the received signal (analog signal) received by the antenna 5 is output to the amplifier module 25.

Figure 4:
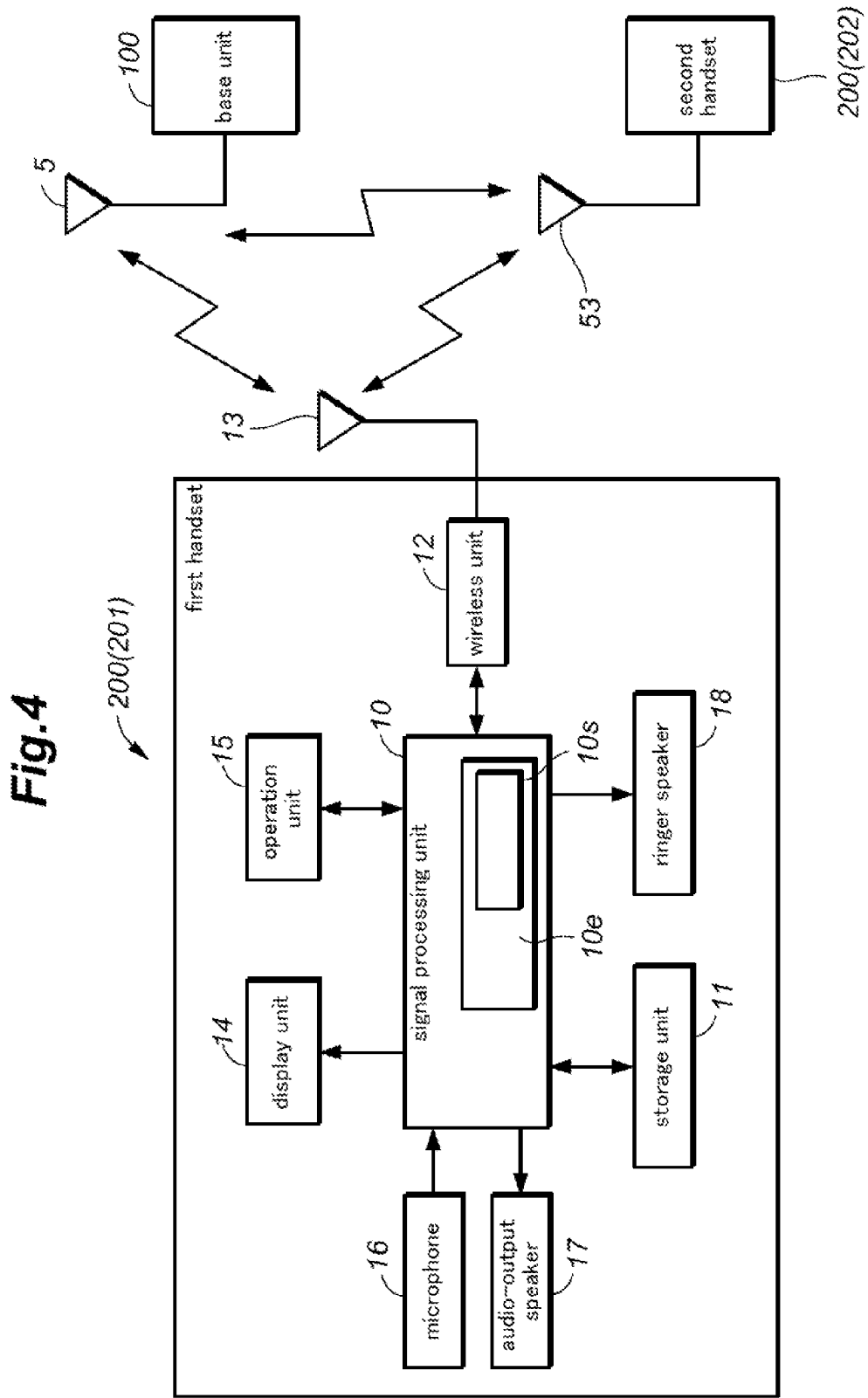
FIG. 4 is a block diagram showing the first handset of the cordless telephone system.

FIG. 4 is a block diagram showing the first handset 201 of the cordless telephone system. As described in the foregoing with reference to FIG. 2B, the first handset 201 includes a display unit 14 for displaying the telephone number of an incoming call or the telephone number input when the user places an outgoing call, an operation unit 15 for allowing the user to input a telephone number (dial information) or the like, a microphone 16 for capturing the user's voice, an audio-output speaker 17 for outputting the voice of the person on the other end of the line based on the received signal, and a ringer speaker 18. Further, the first handset 201 includes a storage unit 11 storing speed dial data, audio guide data or the like, an antenna 13 for transmitting and receiving radio waves to and from the base unit 100 or another handset 200 (the second handset 202), a signal processing unit 10, and a wireless unit 12.

The first handset 201 is generally designed to be compact in size so as to be portable, but the basic functions thereof are substantially the same as those of the base unit 100 described above with reference to FIG. 3. Namely, the structures and functions of the signal processing unit 10 and the wireless unit 12 of the first handset 201 are substantially the same as those of the signal processing unit 10 and the wireless unit 12 of the base unit 100 described above. (for this reason, the same reference numerals are used). Therefore, detailed description of these component parts of the first handset 201 will be omitted.

It is to be noted, however, that the frame processing unit 10e of the signal processing unit 10 in the first handset 201 is provided with a synchronization control unit 10s. The synchronization control unit 10s functions to match the reception timing of the first handset 201 with the transmission timing of the base unit 100. Specifically, when the first handset 201 is turned on, for example, the first handset 201 autonomously performs reception operation periodically at a predetermined reception timing, and during such operation, when the synchronization control unit 10s receives from the base unit 100 a synchronization request that includes data representing a difference between the timing at which the synchronization request is transmitted and the timing with which the reception timing in the first handset 201 should be synchronized, the synchronization control unit 10s adjusts the reception timing so as to eliminate the difference, and the frame processing unit 10e controls the hardware relating to signal processing in accordance with the adjusted reception timing. Thereby, the reception timing of the first handset 201 can be adjusted to coincide with the transmission timing (or time slot for transmission in each frame) used by the base unit 100 in transmission designating the first handset 201.

Figure 5:
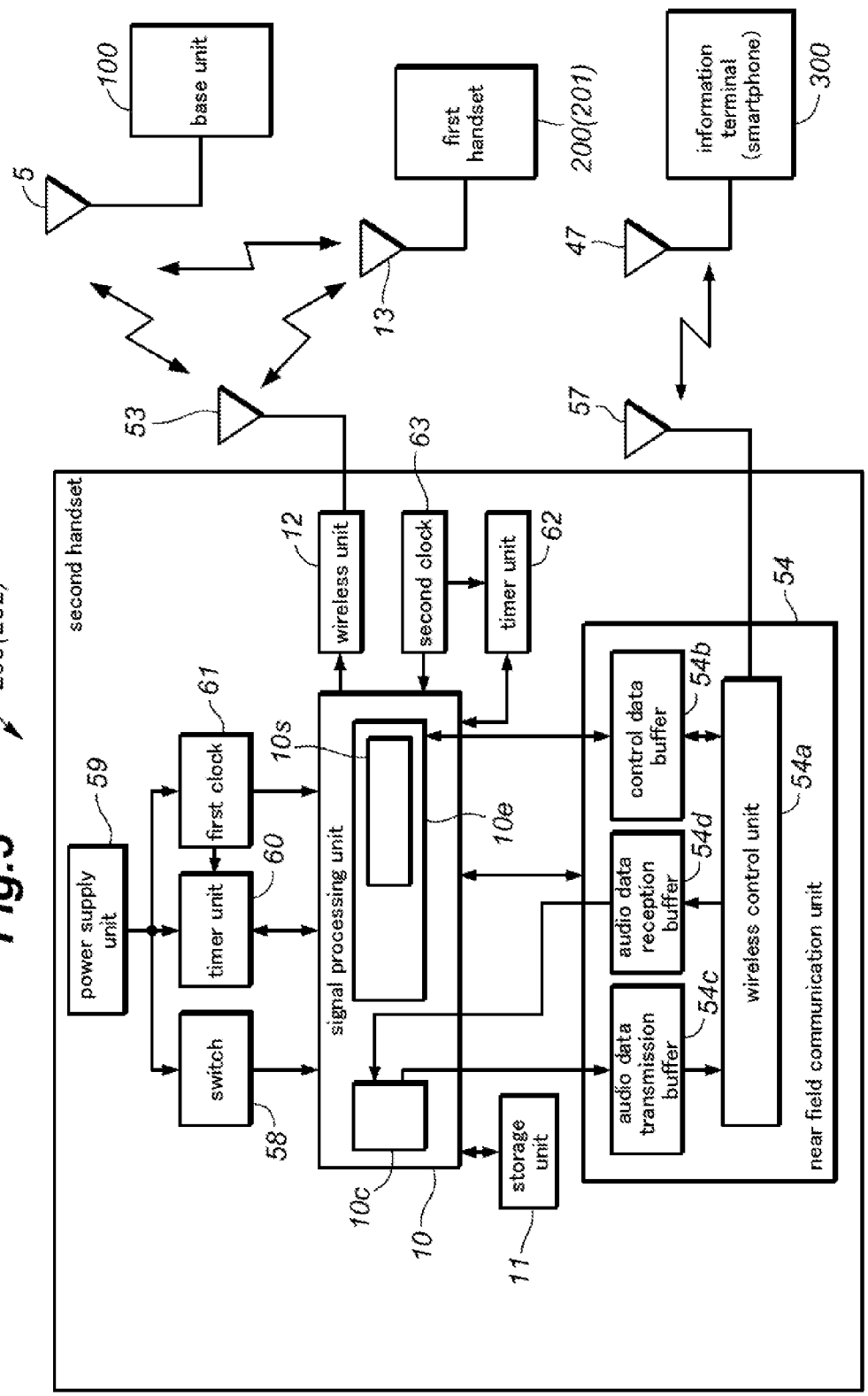
FIG. 5 is a block diagram showing a general structure of the second handset of the cordless telephone system.

FIG. 5 is a block diagram showing a general structure of the second handset 202 of the cordless telephone system. As shown in FIG. 5, the second handset 202 includes a storage unit 11, a wireless unit 12, an antenna 53, a switch 58, a power supply unit 59, timer units 60, 62, a first clock 61, a second clock 63, a signal processing unit 10 and a near field communication unit 54. The structure of the signal processing unit 10 and the wireless unit 12 of the second handset 202 is substantially the same as that of the signal processing unit 10 and the wireless unit 12 of the first handset 201.

The near field communication unit 54 includes a wireless control unit 54a, a control data buffer 54b, an audio data transmission buffer 54c and an audio data reception buffer 54d. The near field communication unit 54 communicates control data with the signal processing unit 10. Further, the near field communication unit 54 receives audio data output from the digital speech processor 10c as data to be transmitted and outputs audio data received by the wireless control unit 54a to the digital speech processor 10c.

The audio data to be transmitted from the second handset 202 to the information terminal 300 is temporarily stored in the audio data transmission buffer 54c. On the other hand, the audio data received from the information terminal 300 is temporarily stored in the audio data reception buffer 54d. The wireless control unit 54a retrieves the audio data stored in the audio data transmission buffer 54c and the control data stored in the control data buffer 54b and analog modulates the retrieved data to transmit it through the antenna 57. Further, the wireless control unit 54a receives, via the antenna 57, modulated control data and audio data transmitted from the antenna 47 of the information terminal 300 and, after demodulating the received data, causes the control data to be stored in the control data buffer 54b and the audio data to be stored in the audio data reception buffer 54d. Thus, the near field communication unit 54 provided to the second handset 202 has functions for performing transmission and reception of audio data or the like between the second handset 202 and the information terminal 300. Thereby, the second handset 202 serves as an adapter (DECT adapter) relaying data between the base unit 100 and the information terminal 300. This DECT adapter includes a function of converting the data format between DECT and another near field communication standard so that the data formats before and after the conversion match the respective standards.

The frame processing unit 10e of the second handset 202 also is provided with a synchronization control unit 10s. The synchronization control unit 10s functions to match the reception timing of the second handset 202 with the transmission timing of the base unit 100. It is to be noted, however, that unlike the first handset 201, the synchronization control unit 10s of the second handset 202 functions to establish synchronization with the base unit 100 when the information terminal 300 connected with the second handset 202 places an outgoing call or receives an incoming call, and after completion of the call by the user, returns to an asynchronous state.

It is to be noted that in the first embodiment, the near field communication unit 54 is provided to the second handset 202 but the near field communication unit 54 may be provided to the first handset 201. The hardware of the synchronization control unit 10s of the first handset 201 is substantially the same as that of the second handset 202, and the first handset includes a user interface including the display unit 14 and the operating unit 15. Therefore, in a case where the first handset 201 is provided with the near field communication unit 54, it is possible to use the first handset 201 as the second handset 202 by changing the timing at which synchronization with the base unit 100 is to be established by inputting appropriate command through the user interface.

The power supply unit 59 includes a rechargeable battery not shown in the drawings, and the power supply voltage is supplied to the various parts of the second handset 202 via the switch 58. In the second handset 202, during a phone call, a signal obtained at the timer unit 62 by frequency dividing the clock signal output from the second clock 63 is provided to the signal processing unit 10, such that the operation timing of the hardware embodying the signal processing unit 10 is controlled based on this signal. On the other hand, in the standby state immediately after the switch 58 is turned on, the clock signal output from the first clock 61 is used. The clock signal output from the first clock 61 has a lower frequency than that of the signal obtained by frequency dividing the clock signal output from the second clock 63 that is used during a phone call (namely, the first clock 61 is a low-speed clock). Further, in the standby state, the signal processing unit 10 sets a frequency division rate in the timer unit 60, such that the clock signal of the first clock 61 or the clock signal obtained by frequency dividing the clock signal of the first clock 61 is output to the signal processing unit 10. Thus, by lowering the clock signal frequency, the second handset 202 minimizes the consumption of power from the battery. It is to be noted that the battery constituting the power supply unit 59 may be a primary cell (a cell that is not rechargeable), which may be a button cell, for example.

Figure 6:
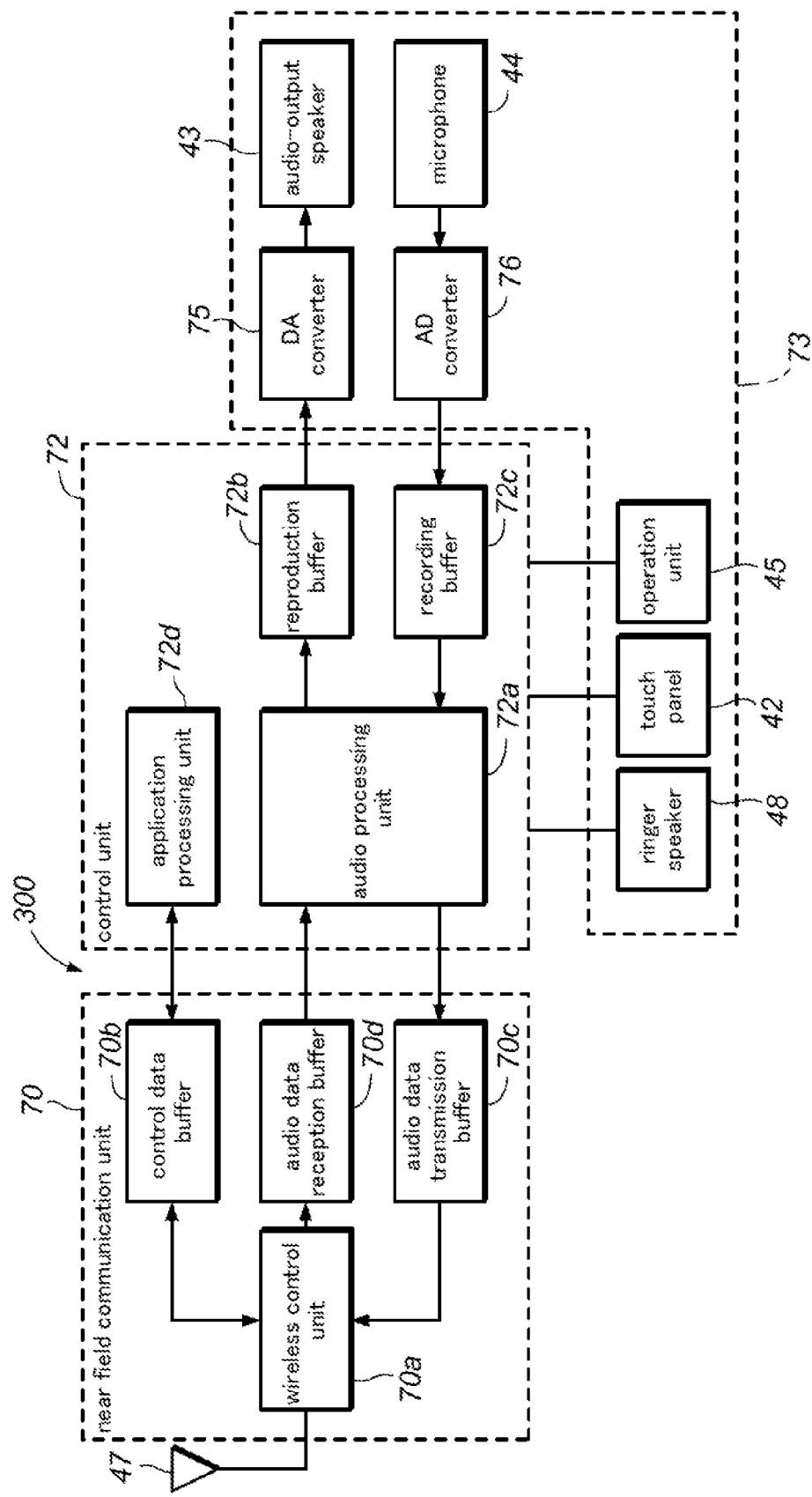
FIG. 6 is a block diagram showing a general structure of the information terminal.

FIG. 6 is a block diagram showing a general structure of the information terminal 300. As shown in FIG. 6, the information terminal 300 includes a control unit 72, a near field communication unit 70 and a user interface unit 73.

The near field communication unit 70 includes a wireless control unit 70a, a control data buffer 70b, an audio data transmission buffer 70c and an audio data reception buffer 70d. The near field communication unit 70 of the information terminal 300 is a structural element that cooperates with the near field communication unit 54 of the second handset 202. The audio data to be transmitted from the information terminal 300 to the second handset 202 is temporarily stored in the audio data transmission buffer 70c. On the other hand the audio data received from the second handset 202 is temporarily stored in the audio data reception buffer 70d. The wireless control unit 70a retrieves the audio data stored in the audio data transmission buffer 70c and the control data stored in the control data buffer 70b, and analog modulates the data to transmit it through the antenna 47. Further, the wireless control unit 70a receives, via the antenna 47, modulated control data and audio data transmitted from the antenna 57 of the second handset 202, and after demodulating the received data, causes the control data to be stored in the control data buffer 70*b* and the audio data to be stored in the audio data reception buffer 70*d*. Thus, the near field communication unit 70 provided to the information terminal 300 has functions for performing transmission and reception of audio data or the like between the information terminal 300 and the second handset 202.

The control unit 72 includes an audio processing unit 72*a*, a reproduction buffer 72*b*, a recording buffer 72*c* and an application processing unit 72*d*. Though not shown in the drawings, the control unit 72 is constituted of a CPU (MPU), an EEPROM storing a control program, a RAM serving as a work memory, and a bus connecting component elements, and controls the overall operation of the information terminal 300.

The audio processing unit 72*a* has a function similar to that of the digital speech processor 10*c* described above (see FIG. 3), and performs noise/echo cancellation, enhancement of specific audio frequencies, encryption/description, etc. on the digitized audio data. the reproduction buffer 72*b* is formed of a FIFO (First In First Out), for example, and temporarily stores the audio data output from the audio processing unit 72*a* and then outputs the audio data sequentially at predetermined timings. The recording buffer 72*c* also is formed of a FIFO, for example, and temporarily stores the audio data to be input to the audio processing unit 72*a*. The application processing unit 72*d* executes later-described application software. The application software is executed by the aforementioned CPU not shown in the drawings.

As described above with reference to FIG. 2C, the user interface unit 73 includes the ringer speaker 48, touch panel 42, operation unit 45, audio-output speaker 43 and microphone 44. Further, the user interface unit 73 includes a DA converter 75 and an AD converter 76.

The audio data and control data transmitted from the second handset 202 are received by the wireless control unit 70*a* via the antenna 47, and the wireless control unit 70*a* demodulates the received data. The audio data is stored in the audio data reception buffer 70*d*, while the control data is stored in the control data buffer 70*b*. The audio data stored in the audio data reception buffer 70*d* is forwarded to and processed by the audio processing unit 72*a* of the control unit 72, and the processed audio data is output to the reproduction buffer 72*b*. The DA converter 75 converts the audio data output from the reproduction buffer 72*b* into an analog audio signal, which is provided to the audio-output speaker 43 via an amplifier not shown in the drawings.

The control unit 72 retrieves the control data from the control data buffer 70*b* and, by analyzing the control data, can detect the status of the second handset 202, which changes depending on whether the base unit 100 receives an incoming call or not. Thus, the control unit 72 can know whether there is an incoming call at the base unit 100 by analyzing the control data.

On the other hand, an analog audio signal generated by the microphone 44 is input to the AD converter 76 via an equalizer and an amplifier not shown in the drawings. The AD converter 76 converts the analog audio signal into digital audio data, which is output to the recording buffer 72*c*. The audio data stored in the recording buffer 72*c* is processed by the audio processing unit 72*a*, and then, output to the audio data transmission buffer 70*c*. Thereafter, the audio data is analog modulated by the wireless control unit 70*a* and transmitted through the antenna 47.

When performing transmission, the application processing unit 72*d* generates control data and writes it in the control data buffer 70*b*, such that the control data is transmitted to the second handset 202 by the wireless control unit 70*a*. The control data generated by the application processing unit 72*d* includes information indicating the state of the information terminal 300, such as whether the user has input dial information using the touch panel 42. Based on the control data, the base unit 100 and/or the second handset 202 determines whether dial information is input by the user of the information terminal 300, if input, detects the dial information.

Figure 7:
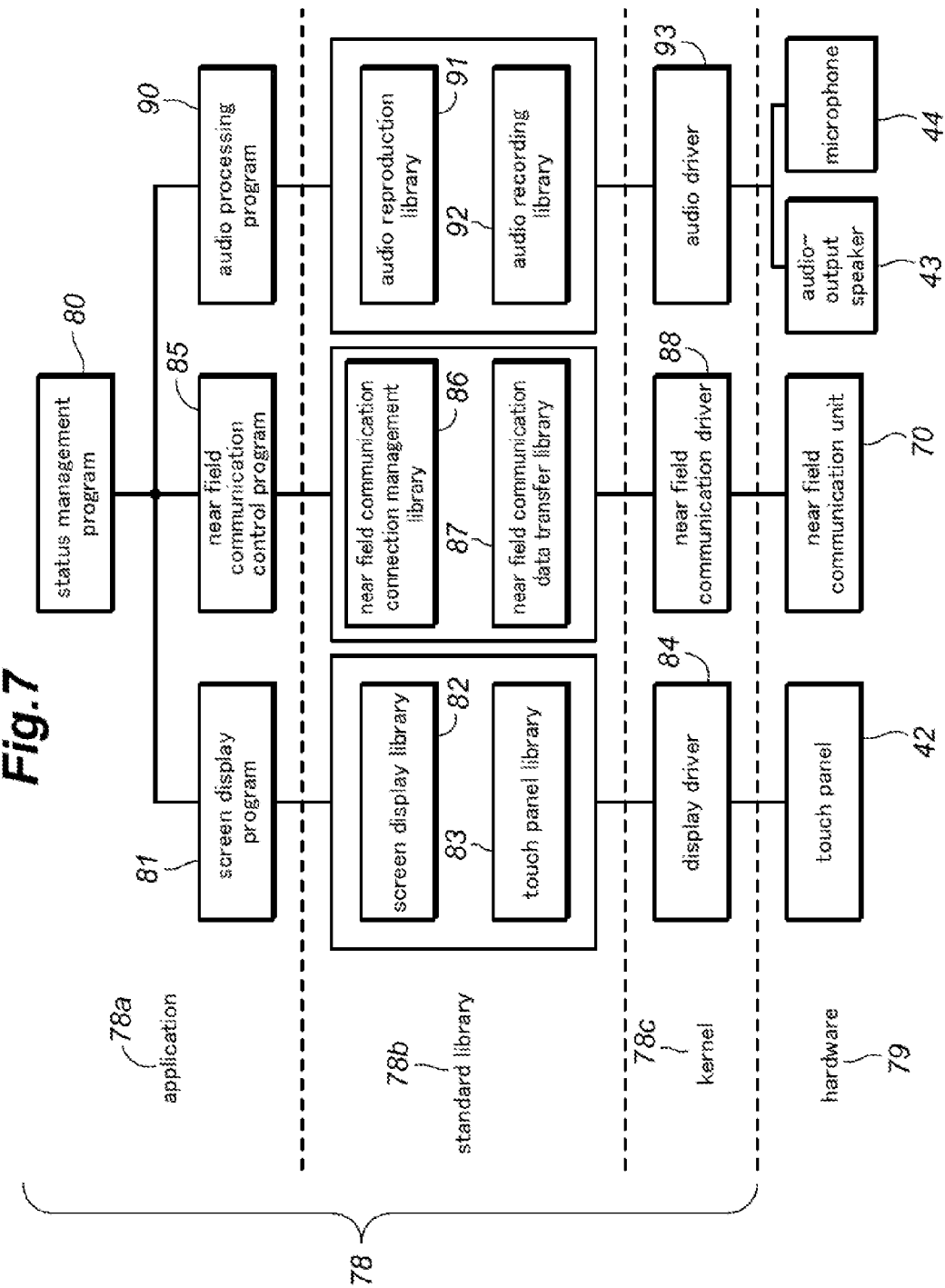
FIG. 7 is a configuration diagram showing a relationship between software and hardware of the information terminal.

FIG. 7 is a configuration diagram showing a relationship between software 78 and hardware 79 of the information terminal 300. The software 78 is to be executed by the control unit 72 of the information terminal 300, more specifically by the application processing unit 72*d* (see FIG. 6). As shown in FIG. 7, the software 78 of the information terminal 300 includes application programs 78*a*, standard libraries 78*b* and a kernel 78*c*, and these groups of software control the hardware 79 directly or indirectly.

The application programs 78*a* include a status management program 80 that controls activation and termination of lower-order programs, a screen display program 81 that controls screen display of the information terminal 300, a near field communication control program 85, which will be described later with reference to a flowchart, and an audio processing program 90 that controls reproduction and recording of sound which is transmitted and received in the form of audio data. The operation of these application programs 78*a* is managed under a prescribed OS (Operating System). In the first embodiment, the application programs 78*a* are provided as "application programs for managing the connection between the second handset 202 and the information terminal 300 and the transmission and reception of audio data" (hereinafter referred to as "connection applications"). The user operates the touch panel 42 of the information terminal 300 to activate the application programs 78*a* before initiating a call and to terminate the application programs 78*a* after completion of a call. It is to be noted that there are two ways "to initiate a call": one is to place an outgoing call from the information terminal 300 and the other is to receive an incoming call by the information terminal 300.

A standard library 78*b* is a group of program components (functions) assembled in a single file, in which each program component has a specific function and is adapted to be used by another program or program component. Further, a driver is a computer program for directly controlling a hardware (device) by writing a control value in an address (register) allocated to the hardware, for example.

The screen display program 81 uses, as standard libraries 78*b*, a screen display library 82 and a touch panel library 83. The screen display library 82 performs coordinate transformation and color conversion, for example, and the touch panel library 83 detects touch operations or hovering operations and obtains coordinates designated by these operations, for example. These libraries control the touch panel 42, which has a display function, via a display driver 84.

The near field communication control program 85 uses, as the standard libraries 78*b*, a near field communication connection management library 86 and a near field communication data transfer library 87. The near field communication connection management library 86 and the near field communication data transfer library 87 include, for example, a connection function, a registry access function, state acquisition function and the like. By calling these functions, it is possible, via a near field communication driver 88, to perform initialization, information setting and registry registration of the near field communication unit 70 (see FIG.

6), obtain information of the party with which transmission and reception is to be performed, and acquire service information, or the like, before communication is performed between the second handset 202 and the information terminal 300.

The audio processing program 90 uses, as standard libraries 78b, an audio reproduction library 91 and an audio recording library 92. The audio reproduction library 91 causes the audio data stored in the register of the audio processing unit 72a, for example, to be written in the reproduction buffer 72b in a batch. On the other hand, the audio recording library 92 causes the audio data stored in the recording buffer 72c to be passed to the audio data to the audio processing unit 72a in a batch. An audio driver 93 drives the audio-output speaker 43 to reproduce sound and operates the microphone 44 to record sound.

Figure 8:
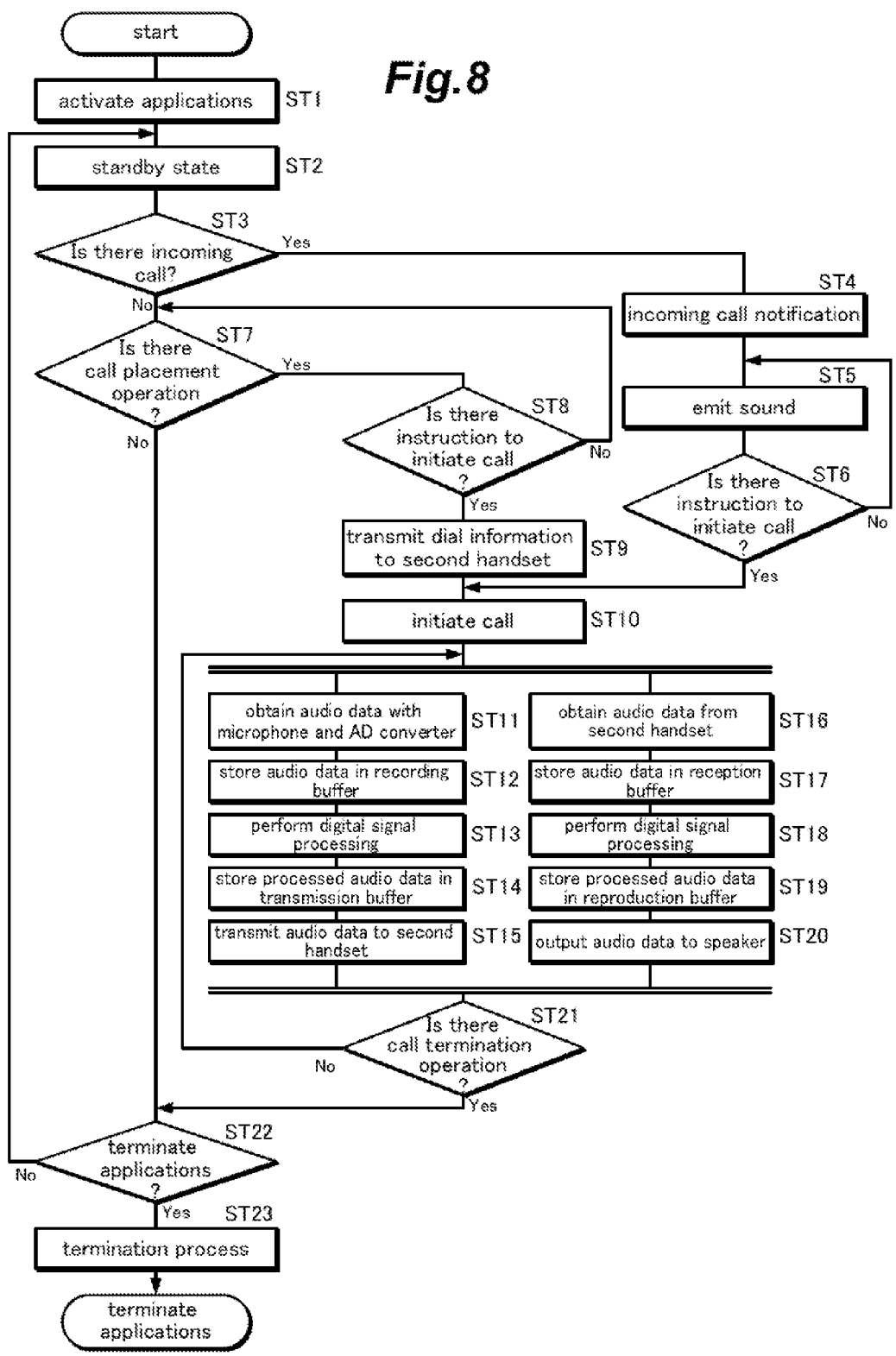
FIG. 8 is a flowchart for explaining an operation of the information terminal relating to placement of an outgoing call and reception of an incoming call.

FIG. 8 is a flowchart for explaining an operation of the information terminal 300 relating to placement of an outgoing call and reception of an incoming call. The flowchart of FIG. 8 shows a process in which the status management program 80, near field communication control program 85, audio processing program 90, etc. are executed by the CPU (not shown in the drawings) included in the aforementioned control unit 72.

When placing an outgoing call or receiving an incoming call with the information terminal 300, the user turns on the switch 58 (see FIG. 2D and FIG. 5) of the second handset 202 and operates the touch panel 42 of the information terminal 300 to activate the "connection applications" (ST1). An operation performed by the user on the touch panel 42 is detected by the CPU included in the control unit 72 (see FIG. 6), and based on the detected operation, the CPU deploys the "connection applications" on the work memory and starts the process. As a result, the information terminal 300 first enters a standby state (ST2). The standby state herein is a state in which both placement of an outgoing call and reception of an incoming call are possible (described in detail later).

Next, the CPU determines via the second handset 202 whether there is an incoming call at the base unit 100 (ST3). In the standby state, when the base unit 100 (see FIGS. 1 and 3) receives an incoming call via the telephone line, the base unit 100 transmits an activation signal to the second handset 202, and thereafter, the second handset 202 establishes synchronization with the base unit 100 (described in detail later). A notification of the establishment of synchronization (synchronization establishment notification) is transmitted via the near field communication unit 54 of the second handset 202 to the near field communication unit 70 of the information terminal 300, whereby the CPU recognizes that there is an incoming call.

Upon recognition of a presence of an incoming call (Yes in step ST3), the CPU performs incoming call information retrieval (ST4). The incoming call information retrieval herein is to receive at the information terminal 300 the control data (described later) transmitted from the base unit 100 via the second handset 202 and analyze the control data to retrieve incoming call information. The incoming call information includes, for example, a sound output command for causing the ringer speaker 48 (see FIG. 6) of the information terminal 300 to output a predetermined sound.

The CPU causes the ringer speaker 48 to emit sound in accordance with the aforementioned command (ST5). Thereafter, the CPU determines whether there is an instruction to initiate a call input via the operation unit 45 (see FIG. 6) (ST6), and if there is an instruction to initiate a call (Yes in step ST6), initiates a call (ST10). On the other hand, if there is not an instruction to initiate a call (No in step ST6), the process is moved to step ST5. It is to be noted that the instruction to initiate a call refers to an operation performed by the user on the touch panel 42 of the information terminal 300 or the like to cause the CPU to initiate a call.

When it is determined that there is no incoming call in step ST3 (No in step ST3), the CPU determines whether there is a call placement operation (ST7). A call placement operation herein refers to an operation performed by a user using the touch panel 42 of the information terminal 300 to input the phone number (dial information) of the party to which a call is to be made.

When it is determined that there is a call placement operation (Yes in step ST7), the CPU further determines whether there is an instruction to initiate a call (ST8). If there is an instruction to initiate a call (Yes in step ST8), the CPU causes the near field communication unit 70 of the information terminal 300 (see FIG. 6) to transmit the dial information to the near field communication unit 54 of the second handset 202 (ST9). This dial information is transmitted from the second handset 202 to the base unit 100, and the base unit 100 transmits a call request to the telephone line according to the dial information.

Thereafter, a call using the information terminal 300 is initiated (ST10). During the call, an audio data transmission process shown in steps ST11 to ST15 and an audio data reception process shown in steps ST16 to ST20 (where transmission and reception are defined relative to the information terminal 300) are executed in parallel. It is to be noted, however, that the parallel processing here does not mean that the transmission process and the reception process are executed exactly simultaneously but that these processes are executed synchronously in a time division manner.

In the following, description will be made of the transmission process and the reception process with additional reference to FIG. 6.

In the transmission process, analog audio signal is obtained by the microphone 44 (ST11). The obtained analog audio signal is amplified by an amplifier not shown in the drawings and then is converted into audio data by being digitized by the AD converter 76. The audio data is temporarily stored in the recording buffer 72c (ST12). It is to be noted that sound is captured by the microphone 44 continuously and AD converted, but the transmission of the audio data from the information terminal 300 to the second handset 202 and the transmission of the audio data from the second handset 202 to the base unit 100 are performed intermittently in a time division multiplexing manner. The recording buffer 72c serves to absorb a difference in timing between capturing of sound by the microphone 44 and transmission of audio data generated by the capturing of sound.

The audio data stored in the recording buffer 72c is subjected to the aforementioned digital signal processing at the audio processing unit 72a (ST13). The digital audio data that has been subjected to the signal processing is temporarily stored in the audio data transmission buffer 70c of the near field communication unit 70 (ST14), and thereafter, is analog modulated by the wireless control unit 70a and transmitted to the second handset 202 via the antenna 47 (ST15). The second handset 202 transmits the received audio data to the base unit 100.

In the reception process, the wireless control unit 70a obtains (receives) modulated audio data from the second handset 202 via the antenna 47 (ST16). The obtained audio data is demodulated by the wireless control unit 70a and the demodulated digital audio data is temporarily stored in the audio data reception buffer 70*d* (ST17). Thereafter, the audio data is subjected to the aforementioned digital signal processing at the audio processing unit 72*a* (ST18) and is temporarily stored in the reproduction buffer 72*b* (ST19).

The digital audio data stored in the reproduction buffer 72*b* is converted into an analog audio signal by the DA converter 75, and after being amplified by an amplifier not shown in the drawings, is provided to the audio-output speaker 43 that outputs sound in accordance with the audio signal (ST20). The transmission of audio data from the second handset 202 to the information terminal 300 and the transmission of audio data from the base unit 100 to the second handset 202 are performed intermittently in a time division multiplexing manner, but sound is reproduced by the audio-output speaker 43 continuously. The reproduction buffer 72*b* serves to absorb a difference in timing between transmission of audio data and output of sound from the speaker 43 based on the transmitted audio data.

Each time the transmission process or the reception process is performed, the CPU determines whether there is a call termination operation (ST21). When there is not a call termination instruction (No in step ST21), the CPU causes the process to move to step ST11 or ST16. As described in the foregoing, the transmission process and the reception process are performed synchronously in time division manner, steps ST11 and ST16 are usually executed alternately. It is to be noted that the call termination instruction refers to an operation performed by the user on the touch panel 42 of the information terminal 300 or the like to cause the CPU to terminate a call.

On the other hand, if there is a call termination instruction (Yes in step ST21) or there is not a call placement operation performed by the user (such as input of a phone number) (No in step ST7), the CPU determines whether there is an instruction to terminate the "connection applications" (ST22). The instruction to terminate the "connection applications" refers to an operation performed by the user on the touch panel 42 of the information terminal 300 or the like to cause the CPU to terminate the execution of the applications.

If the termination of the "connection applications" is instructed (Yes in step ST22), the CPU executes a termination process (ST23). In the termination process, the CPU stops the transmission and reception performed between the information terminal 300 and the second handset 202, and releases the work memory that has been used by the applications. On the other hand, if the termination of the "connection applications" is not instructed (No in step ST22), the CPU causes the process to move to step ST2 and enters the standby state.

Figure 9:
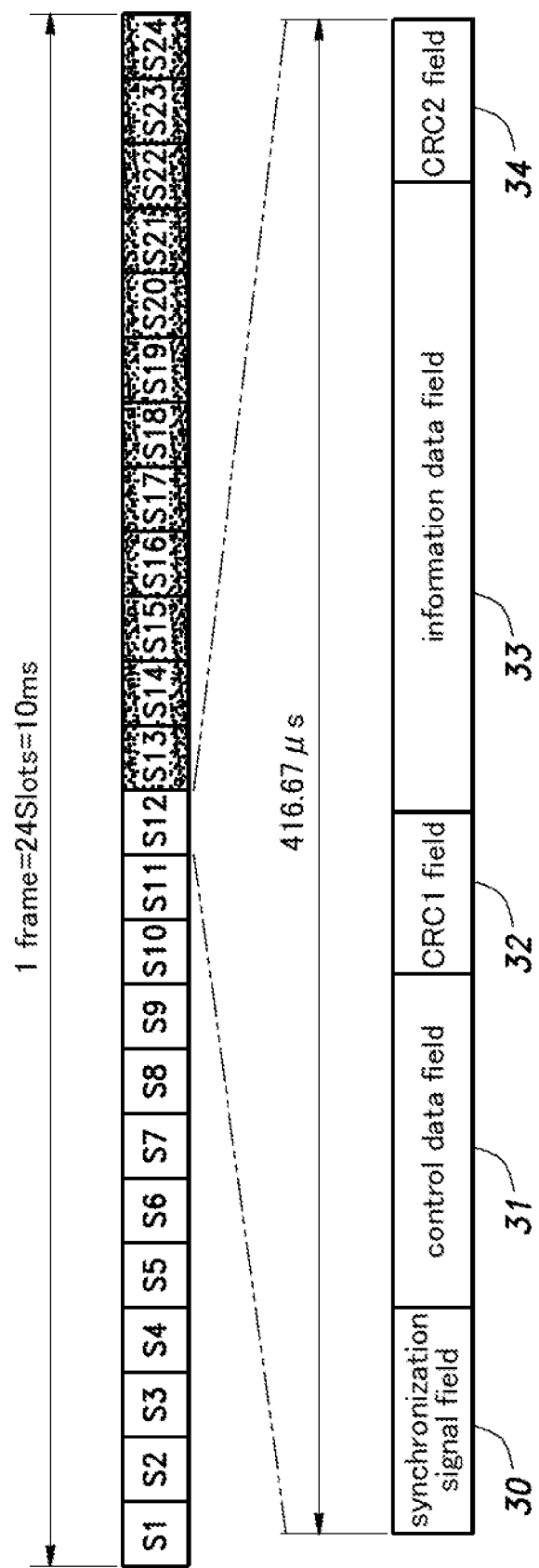
FIG. 9 is an explanatory diagram for explaining the frame structure of DECT.

FIG. 9 is an explanatory diagram for explaining the frame structure of DECT. In DECT, each frame is 10 ms in duration and includes twenty-four slots (twelve slots for up-link and twelve slots for down-link). Typically, slot 1 (S1) to slot 12 (S12) are used for the communication from the base unit 100 to the handsets 200, and slot 13 (S13) to slot 24 (S24) are used for the communication from the handsets 200 to the base unit 100. In the communication between the base unit 100 and the handsets 200, a pair of slots (slot pair) separated from each other by 5 ms, such as slot 1 (S1) and slot 13 (S13) or slot 2 (S2) and slot 14 (S14), are used as a single communication channel.

Of the twelve slots used for transmission from the base unit 100 to the handsets 200, at least one slot (e.g., slot 1 (S1)) is used as a control slot for transmitting control data. The control data is transmitted from the base unit 100 periodically using one slot in each frame while the base unit 100 is on. It is to be noted that radio wave interference may occur during transmission of control data from the base unit 100 to a certain handset 200, disabling the control slot therefor (e.g., slot 1 (S1)). In preparation for such an event, it is possible to monitor the status of idol slots (for example, when slot 1 (S1) is used as the control slot, slot 2 (S2) to slot 12 (S12)) to detect whether the idol slots are used by other units, such that when radio wave interference or the like actually occurs and slot 1 (S1) becomes unable to be used, a slot not in use (e.g., slot 2 (S2)) may be used as the control slot in place of slot 1 (S1). When the slot used as the control slot is changed from slot 1 (S1) to slot 2 (S2), the response slot corresponding to the control slot (a slot used for response to the control slot; namely, used in data transmission from the handset 200 to the base unit 100) is changed from slot 13 (S13) to slot 14 (S14). Thus, the slot used as the control slot can be variably determined depending on the circumstances.

Each slot has a width (duration) of 416.67 µs (=10 ms/24), and includes a synchronization signal field 30, a control data field 31, a CRC1 field 32, an information data field 33 and a CRC2 field 34 defined therein.

The synchronization signal field 30 contains fixed data constituted of a data string for achieving bit synchronization and a data string for achieving slot synchronization. The CRC1 field 32 is a field in which a CRC (Cyclic Redundancy Check) code calculated based on a data string in the control data field 31 is written to detect a transmission error in the control data field 31. Similarly, the CRC2 field 34 contains a CRC code for detecting a transmission error in the information data field 33. When an error is detected owing to the CRC, the handset 200 may request the base unit 100 to re-transmit the data.

The control data field 31 (may be referred to as an A-field) is a field for transmitting, from the base unit 100 to the handsets 200, the control data necessary when placing an outgoing call, when receiving an incoming call, while in the standby mode, etc. Specifically, the control data may include identification information (so-called ID) of the handset(s) 200 to which the control data is directed, data indicating the device performance, data indicating communication quality, data indicating presence of an incoming call, data indicating disconnection, data for retransmission control when a transmission error is detected, and so on.

In the first embodiment, the control data includes the aforementioned "synchronization establishment notification" and "sound output command." Therefore, by referring to the control data field 31 of the data received in the control slot, the second handset 202 can acquire the control data and recognize the instructions from the base unit 100. Then, these instructions are transmitted form the second handset 202 to the information terminal 300 via near field communication.

On the other hand, the information data field 33 (may be referred to as a B-field) is a field for containing a packet of audio data, image data or the like.

When audio data is communicated between the base unit 100 and any of the handsets 200, the audio data is written in the information data field 33. However, in the control slot, only the synchronization signal field 30, control data field 31 and CRC1 field 32 are effective and the information data field 33 and the CRC2 field 34 are not used. In other words, even when the cordless telephone system has no incoming call (or when the system is in the standby mode), the base unit 100 transmits control data to each handset 200 in the control slot allocated thereto in each frame period, and the handset 200 receives the control data.

Further, the handset 200 transmits data, as necessary, to the base unit 100 using the response slot corresponding to the control slot. In the first embodiment, by using this structure, the second handset 202 can transmit the aforementioned "dial information" to the base unit 100.

Figure 10:
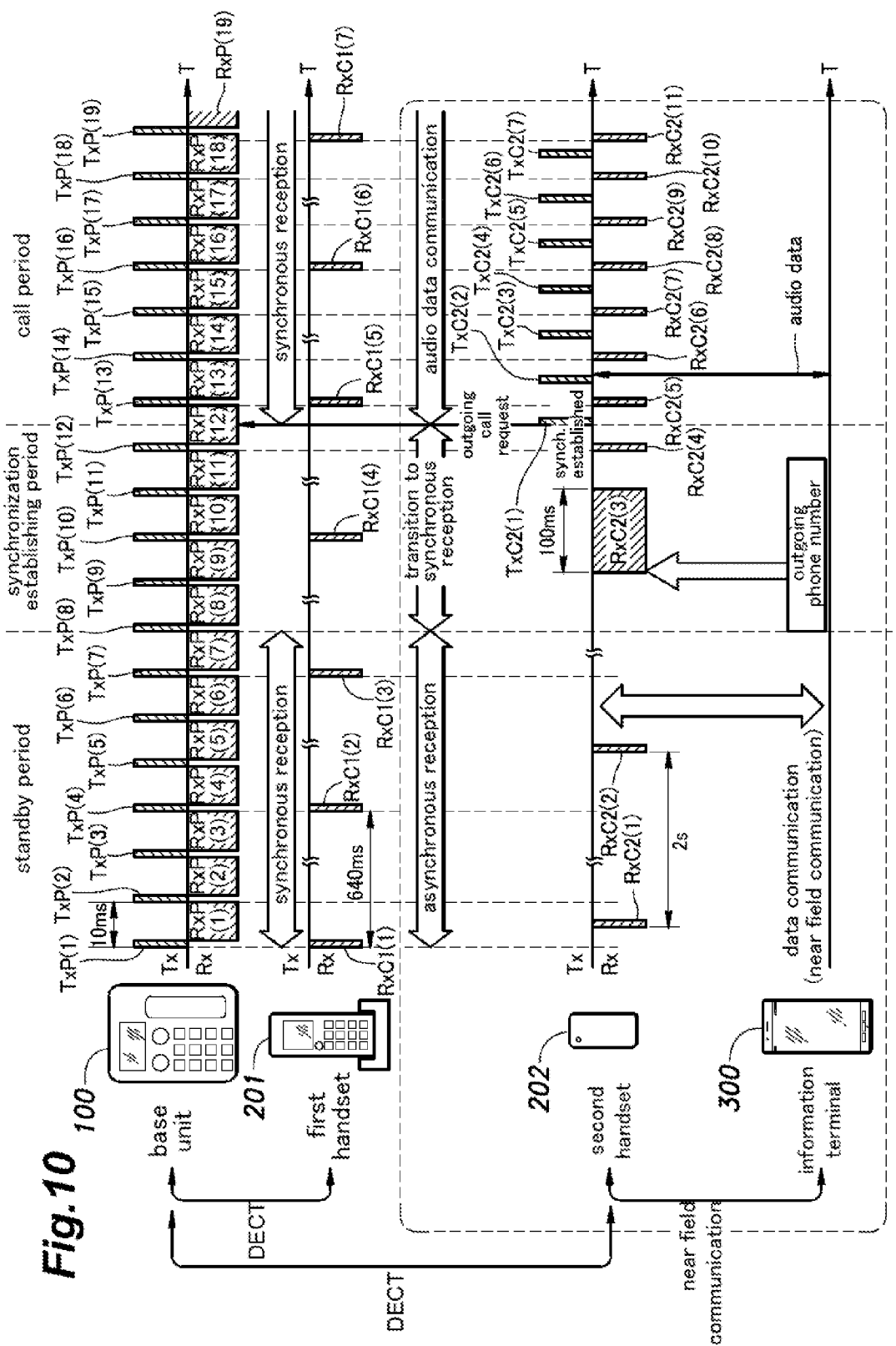
FIG. 10 is an explanatory diagram for showing the content of transmission and reception performed between the second handset and base unit in a case where an outgoing call is made from the information terminal.

FIG. 10 is an explanatory diagram for showing the content of transmission and reception performed between the second handset 202 and base unit 100 in a case where an outgoing call is made from the information terminal 300. It is to be noted that, as described above with reference to FIG. 9, actual pair slots are separated from each other by 5 ms, but in FIG. 10, the slots are shown in a simplified manner (this also applies to FIG. 11).

In the following, with reference to FIG. 10, detailed description will be made of a process of transmission and reception performed between the information terminal 300, second handset 202 and base unit 100 in a case where an outgoing call is made from the information terminal 300 to the telephone line. In the first embodiment, the transmission and reception between the base unit 100 and the second handset 202 are performed based on the DECT standard, while the transmission and reception between the second handset 202 and the information terminal 300 are performed based on the control protocol for near field communication. The transmission and reception of audio data or the like between the second handset 202 and the information terminal 300 are performed using known technology and detailed explanation therefor is omitted (this also applies to the explanation with reference to FIG. 11).

In the following, description will be made with primary focus on the operation of the base unit 100 and the second handset 202 during a standby period, a synchronization establishing period and a call period.

<Standby Period>

During the standby period, the base unit 100 sets a period TxP(n) (n=1, 2, 3 . . . ; the same applies to the following description) as a control slot in each frame period (10 ms) (first periodic interval), and transmits control data in this period (and thus, the transmission is performed periodically). Further, the base unit 100 sets a period RxP(n) as a response period (response slot) corresponding to the control slot, and receives response data, which corresponds to the control data, in the response period. Thus, the response period is provided every frame period having a duration of 10 ms. It is to be noted that the control slot and the response slot are also used in the transmission and reception of audio data, in which audio data is written in the information data field 33 (see FIG. 9).

As described in the foregoing, the first handset 201 establishes synchronization with the base unit 100 when they are turned on, and this synchronization is maintained during the standby period. In the first handset 201, as shown in FIG. 10, a reception timing (or a period RxC1(n)) is set periodically at an interval of 640 ms, for example. Namely, during the standby period, the first handset 201 sets the reception timing in synchronization with the transmission timing of the base unit 100, such that the periodic interval of the reception timing is longer than the periodic interval (first periodic interval) of the transmission timing of the base unit 100. Thus, with the reception timing set at a long periodic interval, the power consumption of the first handset 201 is suppressed.

On the other hand, during the standby period, the second handset 202 performs reception at a reception timing set to be asynchronous with the transmission timing of the base unit 100, as exemplarily indicated by periods RxC2(1) and RxC2(2) in the drawing. Specifically, when the second handset 202 is turned on and receives a synchronization request transmitted from the base unit 100 in a burst mode, where the synchronization request includes correction data indicating a difference between the timing at which the synchronization request is transmitted and the transmission timing of the base unit 100 used for transmitting control data or the like to the second handset 202, the second handset 202 sets its reception timing to be asynchronous with the transmission timing of the base unit 100. Namely, the second handset 202 shifts the reception timing so as to be asynchronous with the transmission timing set in the base unit 100. Further, the periodic interval of occurrence of the reception timing of the second handset 202, such as the interval between the reception periods RxC2(1) and RxC2(2) shown in FIG. 10, is set to be long, such as 2 sec, for example (second periodic interval).

With the reception timing of the second handset 202 being asynchronous with the transmission timing of the base unit 100, the second handset 202 does not need to interpret or analyze the control data received from the base unit 100. Therefore, during the standby period, the signal processing unit 10 (see FIG. 5) of the second handset 202 is kept inoperative, and this reduces the power consumption of the second handset considerably in comparison with that of the first handset 201. It is to be noted, however, that the second handset 202 does not have to actively create a state asynchronous with the base unit 100 immediately after the power is turned on. Namely, the second handset 202 may start performing reception periodically at a predetermined long interval (for example, 2 sec, as mentioned above) when a predetermined time has lapsed after the power is turned on.

As described above, in DECT, a single frame (10 ms) is divided into 24 slots. Therefore, by randomly setting the first reception timing at which the second handset 202 starts performing periodic reception, the probability that the reception timing of the second handset 202 happens to be in synchronization with the transmission timing of the base unit 100 is ¹⁄₂₄. Even if the base unit 100 and the second handset 202 operate in synchronization, the second handset 202 receives control data only once every 2 sec. Further, if the second handset 202 receives control data during the standby period, it is possible to make the base unit 100 and the second handset 202 operate asynchronously by shifting the reception timing of the second handset 202 by 1 ms.

It is to be noted that, during the standby period, transmission and reception of audio data and control data are also performed between the second handset 202 and the information terminal 300 based on the control protocol for near field communication. Under the near field communication standard, the power required for communication is several mW, and thus has very little influence on the overall power consumption of the second handset 202.

<Synchronization Establishing Period>

In the following, description will be made with primary focus on the operation of the base unit 100 and the second handset 202 during the synchronization establishing period. It is to be noted that in the following description, such expressions as "synchronization is established by the second handset 202" will be used for the sake of simplicity, though synchronization is actually established by cooperation of the synchronization control unit 10s, frame processing unit 10e, CPU block 10f, etc. of the signal processing unit 10 of the second handset 202 (this also applied to the later-provided description of an "activation period" in a case where the information terminal 300 receives an incoming call).

During the synchronization establishing period, the user first inputs an outgoing phone number (dial information)

with the touch panel 42 of the information terminal 300. This dial information is transmitted to the second handset 202 based on the control protocol for near field communication. Upon receipt of the dial information, the second handset 202 sets a period RxC2(3) as a reception period. This reception period is set to have a duration of, e.g., 100 ms, which is longer than the periodic interval of 10 ms of the transmission timing of the base unit 100.

During this period RxC2(3), the second handset 202 receives control data from the base unit 100. As the periodic interval of the transmission timing of the base unit 100 is predetermined to be 10 ms, when the second handset 202 receives control data in a period TxP(10), for example, the second handset 202 starts generating an event at a periodic interval of 10 ms, with the timing at which the control data was received being used as a reference point, and based on this event, the signal processing unit 10 (see FIG. 5) determines the reception timing (reception period). In this way, in the illustrated example, synchronization is established by the control data communicated in a transmission period TxP(12) of the base unit 100 (or a reception period RxC2(4) of the second handset 202) and the response data sent back from the second handset 202 in a transmission period TxC2(1) in response to the control data, and thereafter, synchronous reception is performed in place of the asynchronous reception performed prior to the reception of the call request (outgoing phone number) from the information terminal 300.

In the example illustrated in FIG. 10, the response data transmitted from the second handset 202 in the period TxC2(1) is received by the base unit 100 in a period RxP(12). The control data field 31 of this response data includes dial information. The base unit 100 retrieves from the dial information the phone number input by the user with the information terminal 300, and performs an outgoing call process to the telephone line.

<Call Period>

Thereafter, a call is initiated. During a call, synchronization is maintained between the base unit 100 and the second handset 202, and they perform transmission and reception of audio data or the like at the periodic interval of 10 ms (first periodic interval). Specifically, in the illustrated example, the base unit 100 writes in audio data in the information data field 33 (see FIG. 9) and transmits it in a period TxP(13), and this is received by the second handset 202 in a period RxC2(5) and the second handset 202 retrieves the audio data from the information data field 33. This audio data is then passed to the information terminal 300. On the other hand, the information terminal 300 transmits audio data to the second handset 202. The second handset 202 that receives the audio data from the information terminal 300 transmits the audio data in a period TxC2(2), and this audio data is received by the base unit 100 in a period RxP(13). This process is repeated during a call. In this way, audio data is transmitted and received at a high speed between the base unit 100 and the second handset 202 (and hence between the base unit 100 and the information terminal 300), so that a high quality voice communication is performed. The transmission and reception of audio data (together with the control data field) are performed until the call is terminated. The termination of the call is performed when the user selects call termination with some "connection application."

Information indicating that the call termination is instructed is transmitted from the information terminal 300 to the second handset 202, and upon receipt of the information, the second handset 202 transmits response data including this information to the base unit 100. Then, upon receipt of the response data, the base unit 100 performs a process of disconnecting the call. Thereafter, the second handset 202 changes the settings of the timer unit 60 (see FIG. 5) such that the reception timing of the second handset 202 has a long periodic interval and is asynchronous with the transmission timing of the base unit 100.

Figure 11:
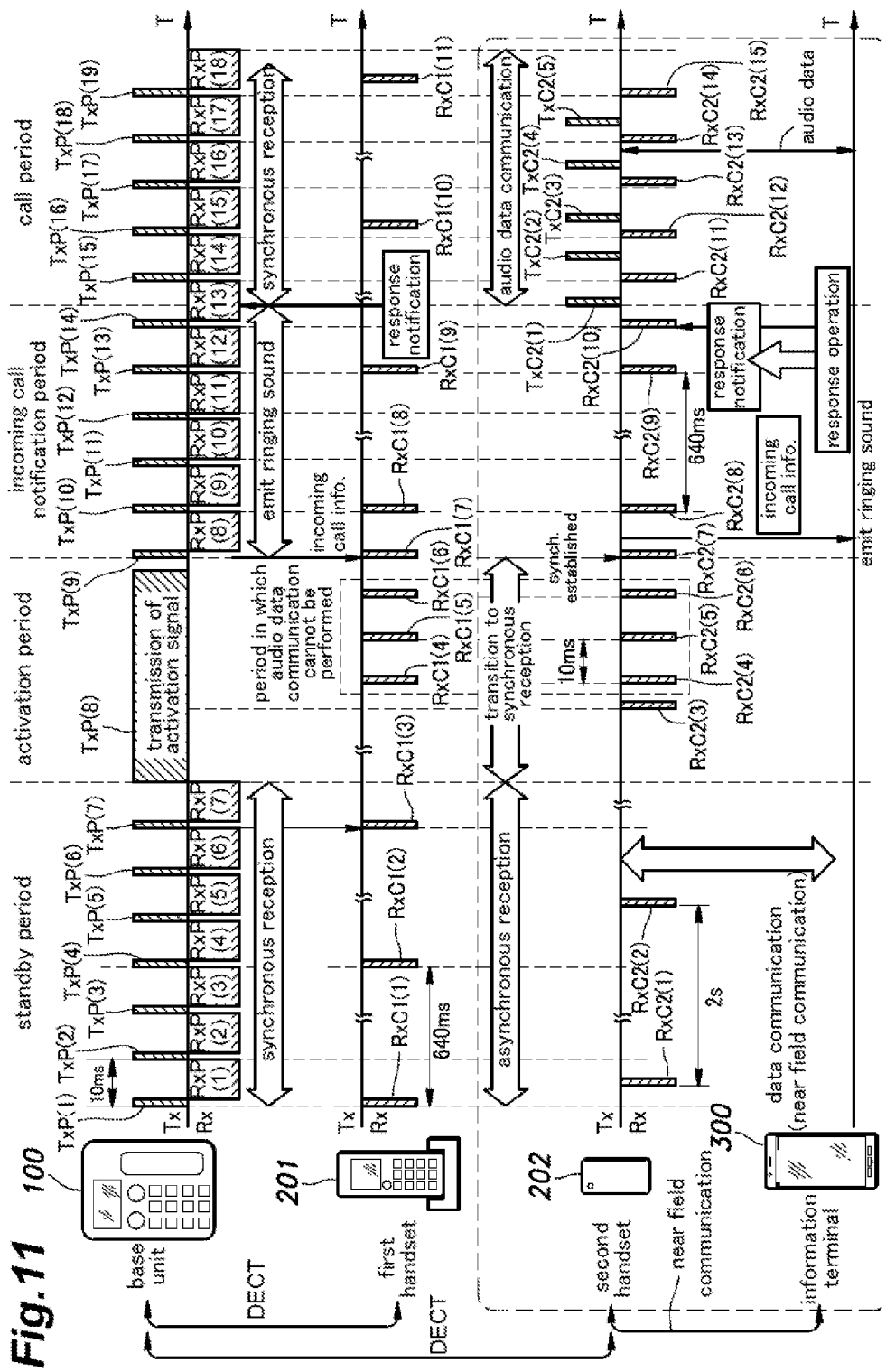
FIG. 11 is an explanatory diagram for showing the content of transmission and reception performed between the second handset and the base unit in a case where the information terminal receives an incoming call.

FIG. 11 is an explanatory diagram for showing the content of transmission and reception performed between the second handset 202 and the base unit 100 in a case where the information terminal 300 receives an incoming call. In the following, with reference to FIG. 11, description will be made of a process of transmission and reception performed between the base unit 100, second handset 202 and information terminal 300 in a case where an incoming call is received by the base unit 100 via the telephone line.

In the following, description will be made with primary focus on the operation of the base unit 100 and the second handset 202 during an activation period and an incoming call notification period. It is to be noted that the operation during the standby period and the call period is substantially the same as that described above with reference to FIG. 10, and thus, detailed description thereof will be omitted.

<Activation Period>

When the base unit 100 receives an incoming call via the telephone line, the base unit 100 stops the transmission that has been performed at the periodic interval of 10 ms (first periodic interval), and sets an activation signal transmission period TxP(8). Then, the base unit 100 transmits an activation signal continuously for a duration of the activation signal transmission period TxP(8). As described in the foregoing, during the standby period, the second handset 202 performs reception at the periodic interval of 2 sec (second periodic interval) asynchronously with the transmission timing of the base unit 100. Thus, the base unit 100 continuously transmits the activation signal for a period of time exceeding at least 2 sec. In the first embodiment, the activation signal is transmitted for a period of time calculated by slot width of 0.417 ms×24 slots×210 times=2.1 sec. It is to be noted that the second periodic interval is determined depending on the periodic interval of the reception timing of the second handset 202 during the standby period, and thus, the aforementioned value of 2 sec is not limiting. For example, in a case where the periodic interval of the reception timing of the second handset 202 is 1.5 sec, the activation signal may be continuously transmitted for a period of time of about 1.6 sec.

The aforementioned activation signal is a kind of control data. During the activation signal transmission period TxP(8), the base unit 100 transmits the control data (activation signal) continuously by using every slot as a control slot. The control data transmitted in each slot includes correction data indicating a difference relative to the slot (channel) that would be used by the base unit 100 once synchronization is established. Namely, different correction data is written and transmitted for different slots (slot 1 (S1) to slot 24 (S24)). Thus, by receiving the control data, the second handset 202 can know the timing at which the response slot is to be set (namely, reception timing) to establish synchronization with the base unit 100.

The second handset 202 repeatedly performs reception at an interval of 2 sec and the base unit 100 continuously transmits the control data for the activation signal transmission period TxP(8) that is longer than the periodic interval of 2 sec. Thus, it is ensured that during the activation signal transmission period TxP(8), the second handset 202 can receive the control data at least once. The second handset 202 that has received the control data refers to the correction data included in the control data and immediately changes the settings of the timer unit 60 (see FIG. 5), and the signal processing unit 10 (see FIG. 5) adjusts the reception timing based on the changed settings. In the example shown in FIG. 11, the second handset 202 receives the control data from the base unit 100 in a reception period RxC2(3), and the reception periods thereafter (namely, RxC2(4), RxC2(5) and so on) are set at a periodic interval of 10 ms that is equal to the periodic interval of the transmission timing of the base unit 100.

The control data received in the reception periods RxC2(3) to RxC2(6) of the second handset 202 may be used in preparation for synchronization (adjustment of the reception timing based on the correction data). Then, when the timing of a transmission period TxP(9) set by the base unit 100 after the activation signal transmission period TxP(8) has lapsed and the timing of a reception period RxC2(7) set by the second handset 202 coincide with each other, synchronization is established. It is to be noted that the aforementioned periods RxC2(3) to RxC2(6) are mere examples, and the process of synchronization may vary depending on the timing at which the second handset 202 receives the control data during the activation signal transmission period TxP(8).

The activation signal transmission period TxP(8) set by the base unit 100 is a period during which the base unit 100 performs only transmission of the control data. Therefore, during the activation signal transmission period, the base unit 100 cannot receive the response data transmitted by the handset 200. Therefore, in the illustrated example, the first handset 201 and the second handset 202 cannot communicate audio data with each other over a period extending from a period RxC2(3) to a period RxC2(7). To shorten this period, it can be conceived, for example, to divide the activation signal transmission period TxP(8) into multiple shorter periods, such that the base unit 100 sets a reception period at the end of each of the multiple shorter periods.

<Incoming Call Notification Period>

When synchronization is established, the second handset 202 analyzes the control data received in the period RxC2(7), and if it is found that the control data includes a "sound output command," transmits the command to the information terminal 300 via near field communication. The information terminal 300 that has received the command causes the ringer speaker 48 (see FIG. 6) to emit a predetermined sound such as a ringing sound. It is to be noted that the control data transmitted by the base unit 100 in the period TxP(9) is also received by the first handset 201 in a period RxC1(7), and accordingly, the first handset 201 also causes the ringer speaker 18 to output a predetermined sound.

While the ringer speaker 48 of the information terminal 300 is emitting a ringing sound, the second handset 202 maintains synchronization with the base unit 100 and sets the reception period to have a periodic interval of, e.g., 640 ms (third periodic interval), as indicated by periods RxC2(8) to RxC2(9). This periodic interval of 640 ms is longer than the aforementioned first periodic interval (10 ms) and shorter than the second periodic interval (2 sec). The second handset 202 sets the reception timing at the periodic interval of 640 ms until an instruction of the user to initiate a call is received.

It is to be noted that the periodic interval of 640 ms is a mere example and is not limiting. The periodic interval of 640 ms is the same as the periodic interval of the reception timing of the first handset 201 described above, and this means that, when the user performs some operation on the first handset 201 or the second handset 202, a response thereto from the base unit 100 can be delayed 640 ms at most. Therefore, the third periodic interval could be any value that will not cause the user to feel any inconvenience. However, if the third periodic interval were 10 ms (first periodic interval), the power consumption would become undesirably large and if 2 sec (second periodic interval), the response would become undesirably slow, and thus, the third periodic interval is preferably set at an intermediate value between the first periodic interval and the second periodic interval.

In this state, synchronization between the base unit 100 and the second handset 202 is maintained so that it is possible to shift to the call period in which 1:1 synchronization is achieved to communicate audio data therebetween. To ensure that the later 1:1 synchronization is possible, the periodic interval of the reception timing of the second handset 202 during the incoming call notification period is set to be n times the periodic interval of the transmission timing set by the base unit 100 (where n is an integer greater than or equal to 2, and is 64 in this embodiment). Thus, in the first embodiment, the frequency of the reception operation performed in the second handset during the incoming call notification period is 1/64 of the frequency of the transmission operation performed in the base unit 100.

Thereafter, when the user performs a response operation (or instruction to initiate a call) using the information terminal 300, a notification indicating the user's performance of a response operation is transmitted to the second handset 202 via near field communication. In response to the notification, the second handset 202 set the periodic interval of the reception at 10 ms, as described above, and transmits the notification indicating the user's performance of a response operation to the base unit 100 in a period TxC2(1), which is a response slot corresponding to a period TxP(14) of the base unit 100, which is a control slot immediately after the user's performance of a response operation with the information terminal 300. The base unit 100 receives the notification indicating the user's performance of a response operation in a period RxP(13) and in response thereto performs a call process (audio data communication).

(Second Embodiment)

In the following, a second embodiment of the present invention will be described with reference to the appended drawings.

Figure 12:
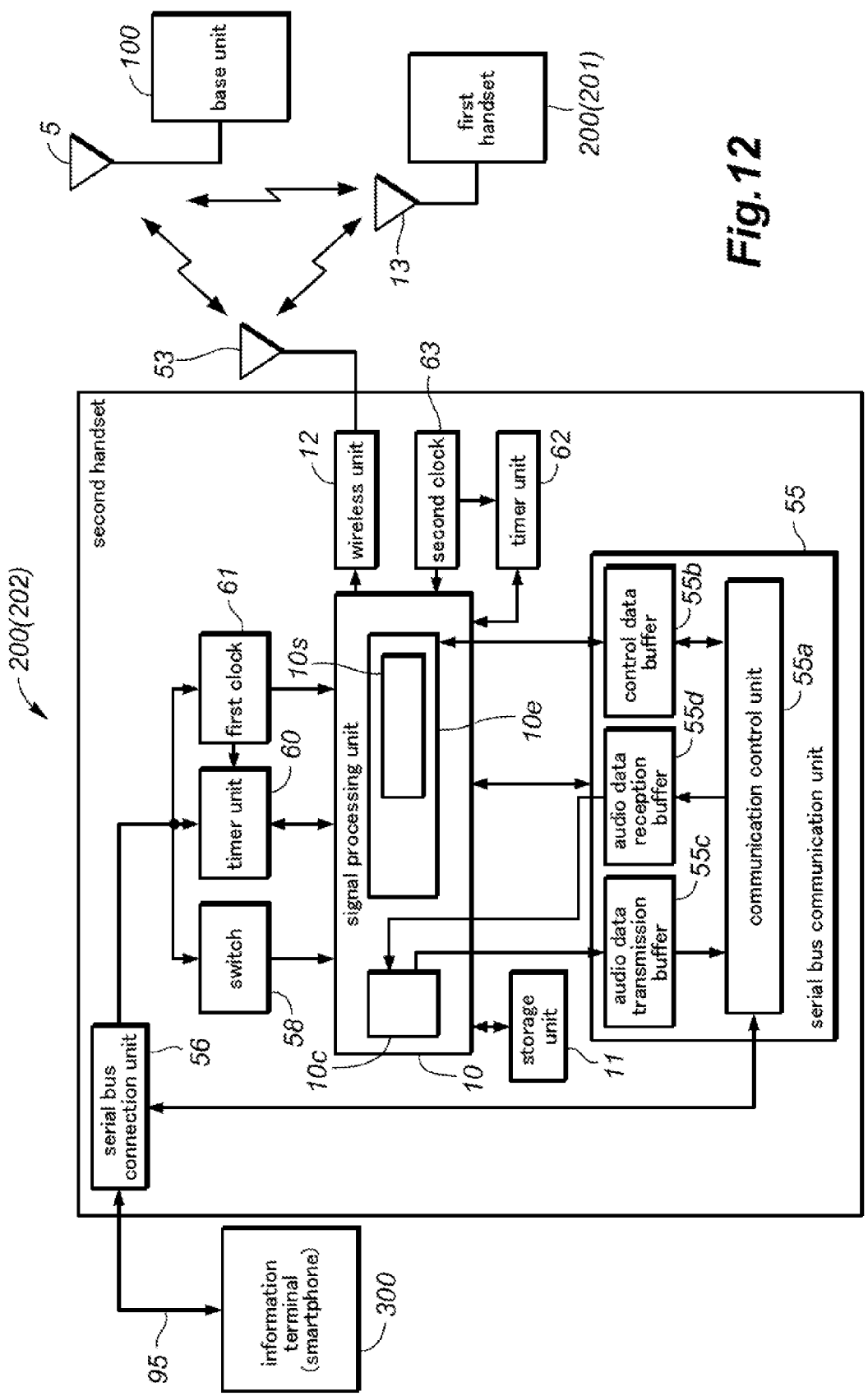
FIG. 12 is a block diagram showing a general structure of a cordless telephone system according to the second embodiment of the present invention.

FIG. 12 is a block diagram showing a general structure of a cordless telephone system according to the second embodiment. In the first embodiment, the second handset 202 and the information terminal 300 are connected with each other via near field communication, but in the second embodiment, they are connected by a wire line, particularly, a serial bus interface.

As shown in FIG. 12, the second handset 202 in the second embodiment includes a storage unit 11, a wireless unit 12, an antenna 53, a switch 58, timer units 60, 62, a first clock 61, a second clock 63 and a signal processing unit 10, a serial bus communication unit 55 and a serial bus connection unit 56. The structure of the signal processing unit 10 and the wireless unit 12 of the second handset 202 are substantially the same as that of the first handset 201.

The serial bus communication unit 55 includes a communication control unit 55a, a control data buffer 55b, an audio data transmission buffer 55c and an audio data reception buffer 55d. The serial bus communication unit 55 communicates control data with the signal processing unit 10. Further, the serial bus communication unit 55 receives audio data output from the digital speech processor 10c as data to be transmitted to the information terminal 300 and outputs audio data received from the information terminal 300 to the digital speech processor 10*c*.

The second handset 202 and the information terminal 300 are physically connected with each other by a serial bus cable 95 for communication. Further, the second handset 202 is supplied electric power from the information terminal 300 via the serial bus cable 95. Namely, the second handset 202 operates as a bus-powered device. This eliminates the need for the second handset 202 to have a battery, and therefore, the second handset 202 can be reduced in size and weight.

The audio data to be transmitted from the second handset 202 to the information terminal 300 is temporarily stored in the audio data transmission buffer 55*c*. On the other hand, the audio data received from the information terminal 300 is temporarily stored in the audio data reception buffer 55*d*. The communication control unit 55*a* retrieves the audio data stored in the audio data transmission buffer 55*c* and the control data stored in the control data buffer 55*b*, and transmits the retrieved data to the information terminal 300 via the serial bus connection unit 56 and the serial bus cable 95. Further, the communication control unit 55*a* receives audio data and control data from the information terminal 300, and stores the received audio data in the audio data reception buffer 55*d*. Thus, the serial bus communication unit 55 provided to the second handset 202 has functions for performing transmission and reception of audio data or the like between the second handset 202 and the information terminal 300.

In the second embodiment, the second handset 202 is provided with the serial bus communication unit 55. Alternatively or in addition, the first handset 201 may be provided with the serial bus communication unit 55.

The electric power supplied to the second handset 202 via the serial bus cable 95 is provided to various parts of the second handset 202 via the switch 58. The structures and functions of the timer unit 60, 62, first clock 61 and second clock 63 in the second embodiment are substantially the same as those in the first embodiment, and thus, description thereof is omitted.

By connecting the second handset 202 having the structure described above to a serial bus interface (not shown in the drawings) provided to the information terminal 300, the base unit 100, second handset 202 and information terminal 300 are connected such that the information terminal 300 can be connected with the telephone line via the base unit 100 and the second handset 202. The structures and functions of the other elements in the second embodiment are substantially the same as those in the first embodiment, and thus, description thereof is omitted.

In the foregoing, detailed description has been made of the cordless telephone system according to the present invention in terms of the concrete embodiments. However, these embodiments are mere examples and the present invention should not be limited to these embodiments.

For example, in the foregoing embodiments, the information terminal 300 was a smartphone, but the information terminal 300 is not limited to a smartphone and the present invention may be applicable to other types of information terminals such as a tablet type. The information terminal 300 does not even have to be portable. Namely, the present invention is useful when the information terminal 300 is a desktop PC (Personal Computer), a client device in a server-client system, or the like.

In the first embodiment, the information terminal 300 and the second handset 202 are connected with each other via near field communication using radio waves, while in the second embodiment, they are connected with each other via the serial bus cable 95. The present invention may be applicable irrespective of an concrete embodiment of an interface connecting the information terminal 300 and the second handset 202. For example, the information terminal 300 and the second handset 202 may be connected with each other by an infrared communication interface.

Further, in the foregoing embodiments, the base unit 100 and the second handset 202 transmit and receive audio data or the like to and from each other based on DECT technology. However, the present invention may be applicable to any system using time division multiple access, such as PHS (Personal Handy-phone System), sPHS (Super PHS) and the like.

In the foregoing embodiments, the system includes a single second handset 202 connected to the information terminal 300. However, the system can include multiple second handsets 202 and each of the multiple second handsets 202 may be connected to a corresponding information terminal 300. Such a configuration is possible because, as described above in relation to the first embodiment, the cordless telephone system according to the present invention uses time division multiple access, and multiple slots for communicating with respective second handsets 202 can be set independently.

In the cordless telephone system according to the present invention, during the standby period, the reception timing of the second handset is set to be asynchronous with the transmission timing of the base unit, such that the second handset performs reception operation at a relatively long periodic interval without receiving control data from the base unit, whereby the power consumption of the second handset connected to the information terminal can be reduced considerably. Therefore, the system according to the present invention can be favorably used as a cordless telephone system adopting DECT, PHS, sPHS, etc.

The contents of the original Japanese patent application(s) on which the Paris Convention priority claim is made for the present application as well as the contents of the prior art references mentioned in this application are incorporated in this application by reference.

The invention claimed is:

1. A cordless telephone system, comprising: a base unit of the cordless telephone system configured to be connected to a telephone line; and a handset configured to transmit and receive radio waves to and from the base unit via wireless channel and includes an interface for communicating with a mobile information terminal, wherein: the mobile information terminal accesses the telephone line by communicating with the handset that communicates with the base unit; when the mobile information terminal is connected to the telephone line via the handset and the base unit, a reception timing of the radio waves by the handset from the base unit is synchronous with a transmission timing of the radio waves from the base unit; and when the handset is within a communication range of the base unit and is in a standby state and the mobile information terminal is not connected to the telephone line via the handset and the base unit, the handset sets the reception timing of the radio waves by the handset from the base unit to be asynchronous with the transmission timing of the radio waves from the base unit by shifting the reception timing of the handset by a period and performs reception from the base unit at the set reception timing.

2. The cordless telephone system according to claim 1, wherein, in the standby state:
the base unit sets the transmission timing at a first periodic interval; and
the handset sets the reception timing at a second periodic interval longer than the first periodic interval,
and when the information terminal is to make an outgoing call via the handset and the base unit:
the handset sets a reception period having a duration longer than the first periodic interval; and
the handset establishes transmission and reception synchronization with the base unit based on control data transmitted by the base unit during the reception period.

3. The cordless telephone system according to claim 1, wherein, in the standby state:
the base unit sets the transmission timing at a first periodic interval; and
the handset sets the reception timing at a second periodic interval longer than the first periodic interval,
and wherein, when the information terminal is to receive an incoming call via the base unit and the handset:
the base unit sets a transmission period having a duration longer than the second periodic interval; and
the handset establishes transmission and reception synchronization with the base unit based on control data transmitted by the base unit during the transmission period.

4. The cordless telephone system according to claim 2, wherein, when the information terminal performs transmission and reception of audio data via the handset and the base unit after the establishment of synchronization between the handset and the base unit, the handset sets the reception timing at the first periodic interval.

5. The cordless telephone system according to claim 3, wherein after the establishment of synchronization between the handset and the base unit and before the information terminal performs transmission and reception of audio data via the handset and the base unit, the handset sets the reception timing at a third periodic interval that is longer than the first periodic interval and shorter than the second periodic interval, the third periodic interval being n times the first periodic interval, where n is an integer greater than or equal to 2.

6. The cordless telephone system according to claim 1, wherein the base unit and the handset are configured to perform transmission and reception based on time division multiple access.

7. The cordless telephone system according to claim 1, wherein:
the interface is configured to connect the handset and the information terminal via a wireless channel.

8. The cordless telephone system according to claim 1, wherein:
the interface is configured to connect the handset and the information terminal via a wired channel.

9. A handset of a cordless telephone system, the handset being configured to transmit and receive radio waves via wireless channel to and from a base unit of the cordless telephone system configured to be connected to a telephone line, wherein: a mobile information terminal accesses the telephone line by communicating with the handset that communicates with the base unit; the handset includes an interface for communicating with the mobile information terminal; and when the mobile information terminal is connected to the telephone line via the handset and the base unit of the cordless telephone system, a reception timing of the radio waves by the handset from the base unit is synchronous with a transmission timing of the radio waves from the base unit, when the handset is within a communication range of the base unit and is in a standby state and the mobile information terminal is not connected to the telephone line via the handset and the base unit, the handset sets the reception timing of the radio waves by the handset from the base unit to be asynchronous with the transmission timing of the radio waves from the base unit by shifting the reception timing of the handset by a period and performs reception from the base unit at the set reception timing.

10. The handset according to claim 9, wherein:
in the standby state, the handset sets the reception timing at a periodic interval longer than a periodic interval of the transmission timing of the base unit; and
when the information terminal is to make an outgoing call via the handset and the base unit, the handset sets a reception period having a duration longer than the periodic interval of the transmission timing of the base unit, and establishes transmission and reception synchronization with the base unit based on control data transmitted by the base unit during the reception period.

11. The handset according to claim 9, wherein:
in the standby state, the handset sets the reception timing at a periodic interval longer than a periodic interval of the transmission timing of the base unit; and
when the information terminal is to receive an incoming call via the base unit and the handset, the handset establishes synchronization with the base unit based on control data transmitted by the base unit during a transmission period having a duration longer than the periodic interval of the reception timing.

12. The handset according to claim 9, wherein the handset is configured to perform transmission and reception to and from the base unit based on time division multiple access.

13. The handset according to claim 9, wherein:
the interface is configured to connect the handset and the information terminal via a wireless channel.

14. The handset according to claim 9, wherein:
the interface is configured to connect the handset and the information terminal via a wired channel.

15. A cordless telephone system, comprising: a base unit of the cordless telephone system configured to be connected to a telephone line; a mobile information terminal configured to be connected with a mobile wireless channel; and a handset configured to perform wireless communication with the base unit based on DECT standard and to be connected with the mobile information terminal, wherein, the mobile information terminal accesses the telephone line by communicating with the handset that communicates with the base unit; when the mobile information terminal is connected to the telephone line via the handset and the base unit, a reception timing of the radio waves by the handset from the base unit is synchronous with a transmission timing of the radio waves from the base unit, when the handset is within a communication range of the base unit and is in a standby state and the mobile information terminal is not connected to the telephone line via the handset and the base unit, the handset sets a reception timing of the radio waves by the handset from the base unit to be asynchronous with a transmission timing of the radio waves from the base unit by shifting the reception timing of the handset by a period and performs reception from the base unit at the set reception timing, and when the base unit receives an incoming call via the telephone line while the mobile information terminal is in a standby state, the base unit transmits to the handset activation signals continuously for a duration longer than an interval of the reception timing of the handset and the handset notifies the mobile information terminal of the reception of the incoming call.

* * * * *